US012803010B2

(12) United States Patent
Lee et al.

(10) Patent No.: US 12,803,010 B2
(45) Date of Patent: Nov. 17, 2026

(54) ELECTROCHEMICAL ELEMENT AND METHOD FOR MANUFACTURING SAME

(71) Applicant: INDUSTRY-UNIVERSITY COOPERATION FOUNDATION HANYANG UNIVERSITY ERICA CAMPUS, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: INDUSTRY-UNIVERSITY COOPERATION FOUNDATION HANYANG UNIVERSITY ERICA CAMPUS, Ansan-Si (KR)

( * ) Notice: Subject to any disclaimer, the term of this patent is extended or adjusted under 35 U.S.C. 154(b) by 561 days.

(21) Appl. No.: 17/800,915

(22) PCT Filed: Feb. 22, 2021

(86) PCT No.: PCT/KR2021/002218
§ 371 (c)(1),
(2) Date: Aug. 19, 2022

(87) PCT Pub. No.: WO2021/167435
PCT Pub. Date: Aug. 26, 2021

(65) Prior Publication Data

US 2023/0079918 A1 Mar. 16, 2023
US 2023/0420700 A9 Dec. 28, 2023

(30) Foreign Application Priority Data

Feb. 20, 2020 (KR) ........................ 10-2020-0021252
Feb. 20, 2020 (KR) ........................ 10-2020-0021253
(Continued)

(51) Int. Cl.
*H01M 8/0239* (2016.01)
*C25B 1/04* (2021.01)
(Continued)

(52) U.S. Cl.
CPC ............ *H01M 8/0239* (2013.01); *C25B 1/04* (2013.01); *C25B 9/19* (2021.01); *C25B 13/08* (2013.01)

(58) Field of Classification Search
None
See application file for complete search history.

(56) References Cited

U.S. PATENT DOCUMENTS 4,049,879 A 9/1977 Thompson et al.
6,001,507 A 12/1999 Ono et al.
(Continued)

FOREIGN PATENT DOCUMENTS

CN 103441300 A 12/2013
CN 104874427 A 9/2015
(Continued)

OTHER PUBLICATIONS

Kotatha et al., "Preparation and characterization of gel electrolyte with bacterial cellulose coated with alternating layers of chitosan and alginate for electric double-layer capacitors", Res Chem Intermed., 44:4971-4987, https://doi.org/10.1007/s11164-018-3348-6 (2018). (Year: 2018).*

(Continued)

*Primary Examiner* — Louis J Rufo
(74) *Attorney, Agent, or Firm* — Secant IP, P.L.L.C.

(57) ABSTRACT

An electrochemical element is provided. The electrochemical element may comprise an anode, a cathode on the anode, and an anion exchange membrane disposed between the cathode and the anode and including cellulose and chitosan.

5 Claims, 17 Drawing Sheets

(a)

(b)

(30) Foreign Application Priority Data

| | | |
|---|---|---|
| Feb. 21, 2020 | (KR) | 10-2020-0021894 |
| Jan. 21, 2021 | (KR) | 10-2021-0008626 |
| Jan. 21, 2021 | (KR) | 10-2021-0008627 |

(51) Int. Cl.

*C25B 9/19* (2021.01)
*C25B 13/08* (2006.01)

(56) References Cited

U.S. PATENT DOCUMENTS

| | | | |
|---|---|---|---|
| 7,629,080 | B1 | 12/2009 | Allen et al. |
| 8,257,849 | B2 | 9/2012 | Uchida |
| 8,277,966 | B2 | 10/2012 | Yoon et al. |
| 8,716,168 | B2 | 5/2014 | Yoo et al. |
| 9,350,025 | B2 | 5/2016 | Monden et al. |
| 9,362,567 | B2 | 6/2016 | Kim et al. |
| 9,751,078 | B2 | 9/2017 | Yoo et al. |
| 9,954,231 | B2 | 4/2018 | Kim et al. |
| 10,026,966 | B2 | 7/2018 | Kakehata et al. |
| 10,199,692 | B2 | 2/2019 | Kim et al. |
| 10,566,670 | B2 | 2/2020 | Choi |
| 2010/0068461 | A1 | 3/2010 | Wallace et al. |
| 2011/0031935 | A1 | 2/2011 | Miyoshi et al. |
| 2014/0227595 | A1 | 8/2014 | Upreti |
| 2014/0248539 | A1 | 9/2014 | Liu |
| 2015/0050556 | A1 | 2/2015 | Liu et al. |
| 2015/0140452 | A1 | 5/2015 | Park et al. |
| 2016/0322684 | A1 | 11/2016 | Choi |
| 2016/0322685 | A1 | 11/2016 | Choi |
| 2017/0141429 | A1 | 5/2017 | Lee et al. |
| 2017/0373320 | A1 | 12/2017 | Choi et al. |
| 2018/0108941 | A1 | 4/2018 | Lee et al. |
| 2018/0114967 | A1 | 4/2018 | Kim et al. |
| 2019/0067737 | A1 | 2/2019 | Zhi et al. |
| 2019/0134609 | A1 | 5/2019 | Yamauchi et al. |
| 2019/0181520 | A1 | 6/2019 | Baik et al. |
| 2019/0273297 | A1 | 9/2019 | Weisenstein et al. |
| 2019/0309426 | A1 | 10/2019 | Jin et al. |
| 2020/0112050 | A1 | 4/2020 | Hu et al. |
| 2021/0408567 | A1 | 12/2021 | Lee et al. |
| 2022/0059888 | A1 | 2/2022 | Iwata et al. |

FOREIGN PATENT DOCUMENTS

| | | | | |
|---|---|---|---|---|
| CN | 105449228 | A | 3/2016 | |
| CN | 105733004 | A * | 7/2016 | .......... H01M 8/1041 |
| CN | 107565159 | A | 1/2018 | |
| CN | 107873104 | A | 4/2018 | |
| CN | 110227454 | A | 9/2019 | |
| CN | 106784611 | B | 10/2019 | |
| EP | 2395588 | A1 | 12/2011 | |
| EP | 3089258 | A1 | 11/2016 | |
| JP | 2005154710 | | 6/2005 | |
| JP | 2006156041 | | 6/2006 | |
| JP | 2009541198 | | 11/2009 | |
| JP | 2015504568 | A2 | 2/2015 | |
| JP | 2015198056 | A2 | 11/2015 | |
| JP | 5924731 | B2 | 5/2016 | |
| JP | 6041813 | | 12/2016 | |
| JP | 2017516274 | | 6/2017 | |
| JP | 6303278 | B2 | 4/2018 | |
| KR | 10-2007-0110568 | A | 11/2007 | |
| KR | 10-2011-0083940 | A | 7/2011 | |
| KR | 10-2012-0094249 | A | 8/2012 | |
| KR | 10-2012-0139066 | A | 12/2012 | |
| KR | 10-2013-0064019 | A | 6/2013 | |
| KR | 10-1281772 | B1 | 7/2013 | |
| KR | 10-2013-0118582 | A | 10/2013 | |
| KR | 10-2014-0046213 | A | 4/2014 | |
| KR | 10-2014-0137427 | A | 12/2014 | |
| KR | 10-2015-0031213 | A | 3/2015 | |
| KR | 10-1572545 | B1 | 11/2015 | |
| KR | 10-2016-0122009 | A | 10/2016 | |
| KR | 10-2016-0128164 | A | 11/2016 | |
| KR | 10-1733492 | B1 | 5/2017 | |
| KR | 101734301 | | 5/2017 | |
| KR | 10-2018-0000941 | A | 1/2018 | |
| KR | 10-2018-0004407 | A | 1/2018 | |
| KR | 10-1827155 | B1 | 2/2018 | |
| KR | 10-2019-0139586 | A | 12/2019 | |
| KR | 10-2019-0139911 | A | 12/2019 | |
| KR | 10-2019-0142669 | A | 12/2019 | |
| WO | 2014/200198 | | 12/2014 | |

OTHER PUBLICATIONS

Lai et al (Cellulose (2014) 21:2757-2772). (Year: 2014).*

Das, Gautam, Bang Ju Park, and Hyon Hee Yoon. "A bionanocomposite based on 1, 4-diazabicyclo-[2.2. 2]-octane cellulose nanofiber cross-linked-quaternary polysulfone as an anion conducting membrane." Journal of Materials Chemistry A 4.40 (2016):15554-15564. (Year: 2016).*

Kibsgaard et al., "Molybdenum Phosphosulfide: An Active, Acid-Stable, Earth-Abundant Catalyst for the Hydrogen Evolution Reaction", Angew. Chem. Int. Ed., 53, 1-6 (2014).

Kotatha et al., "Preparation and characterization of gel electrolyte with bacterial cellulose coated with alternating layers of chitosan and alginate for electric double-layer capacitors", Res Chem Intermed., 44:4971-4987, https://doi.org/10.1007/s11164-018-3348-6 (2018).

Luo et al., "Characterization of TEMPO-oxidized bacterial cellulose scaffolds for tissue engineering applications", Materials Chemistry and Physics, http://dx.doi.org/10.1016/j.matchemphys.2013.09.012 (2013).

Patel et al., "Electrochemically active and robust cobalt doped copper phosphosulfide electrocatalysts for hydrogen evolution reaction in electrolytic and photoelectrochemical water splitting", International Journal of Hydrogen Energy, https://doi.org/10.1016/j.ijhydene.2018.02.147 (2018).

Yue et al., "Sulfonated bacterial cellulose/polyaniline composite membrane for use as gel polymer electrolyte", Composites Science and Technology, 145 122-131 (2017).

Muhmed et al., "Emerging chitosan and cellulose green materials for ion exchange membrane fuel cell: a review", Energ. Ecol. Environ., https://doi.org/10.1007/s40974-019-00127-4 (Jul. 22, 2019).

International Search Report and Written Opinion for International Patent Application PCT/KR2021/002218, mailed May 27, 2021 (9 pages).

U.S. Appl. No. 17/798,424 (English translation of originally-filed application papers), filed Aug. 9, 2022 (108 pages).

U.S. Appl. No. 17/800,913 (English translation of originally-filed application papers), filed Aug. 19, 2022 (119 pages).

U.S. Appl. No. 17/800,926 (English translation of originally-filed application papers), filed Aug. 19, 2022 (132 pages).

Das et al., "Quaternized cellulose and graphene oxide crosslinked polyphenylene oxide based anion exchange membrane" and "Electronic Supplementary Information", Scientific Reports, vol. 9, 18 pages (2019).

Extended European Search Report, Europe Patent Application EP 21 756 906.0 (search report dated Mar. 24, 2025) (8 pages).

Foresti et al., "Applications of bacterial cellulose as precursor of carbon and composites with metal oxide, metal sulfide and metal nanoparticles: A review of recent advances", Carbohydrate Polymers, 157, 447-467 (2017).

Kim, Hyeyun et al., ACS Applied Energy Materials, "Lithium Ion Battery Separators Based on Carboxylated Cellulose Nanofibers from Wood", 2019, vol. 2, pp. 1241-1250 (Year: 2019).

Kim, Jaehwan et al., J. Polym. Res., "Preparation and characterization of a Bacterial cellulose/Chitosan composite for potential biomedical application", 2011, vol. 18, pp. 739-744 (Year: 2011).

Phisalaphong, Muenduen et al., Carbohydrate Polymers, "Biosynthesis and characterization of bacteria cellulose-chitosan film", 2008, vol. 74, pp. 482-488 (Year: 2008).

Torres, F.G. et al., Materials Science & Engineering C, "Bacterial cellulose nanocomposites: An all-nano type of material", 2019, vol. 98, pp. 1277-1293 (Year: 2019).

(56) References Cited

OTHER PUBLICATIONS

Xu et al., "Sulfur-doped Cu3P | S electrocatalyst for hydrogen evolution reaction", Materials Research Express, vol. 6, No. 7, p. 75501 (doi: 10.1088/2053-1591/ab1293) (2019).
U.S. Appl. No. 18/418,304, Notice of Allowance dated Jun. 4, 2025 (11 pages).
Fernandes et al., "Novel transparent nanocomposite films based on chitosan and bacterial cellulose", Green Chem., 11, 2023-2029 (2009).
U.S. Appl. No. 17/418,304, Notice of Allowance dated Jun. 4, 2025 (11 pages).
M. Minakshi et al., "Synthesis and characterization of olivine LiNiPO1 for aqueous rechargeable battery", Electrochimica Acta, 56, Jan. 31, 2011, pp. 4356-4360.
Li et al., "Multifunctional Transition Metal-Based Phosphides in Energy-Related Electrocatalysis", Advanced Energy Materials, 10, 1902104 (2020).
Notice of Allowance, U.S. Appl. No. 17/798,424, dated Dec. 30, 2025 (10 pages).
Notice of Allowance, U.S. Appl. No. 17/800,913, dated Jun. 5, 2026.

* cited by examiner

CBCs bCBCs qCBCs

ELECTROCHEMICAL ELEMENT AND METHOD FOR MANUFACTURING SAME

BACKGROUND OF THE INVENTION

1. Field of the Invention

The present application relates to an electrochemical element and a method for manufacturing the same, and more particularly, to an alkaline water electrolysis cell, an alkaline fuel cell, and a method for manufacturing the same.

2. Description of the Related Art

Recently, the hydrogen economy is growing rapidly centered on the hydrogen electric vehicle and fuel cell market, and major advanced countries have invested a lot of time and costs to improve technological and industrial perfection in all stages of a hydrogen value chain, including production, transportation, storage, and utilization, so as to take a lead in the hydrogen economy. According to a report published by McKinsey (Hydrogen scaling up, 2017), the global hydrogen demand in 2050 is expected to reach 78 EJ (about 13.26 billion barrels of oil equivalent) per year. The report predicts that hydrogen consumption will increase sharply with technological advances in the field of hydrogen utilization, though hydrogen is now mainly used as an industrial raw material.

With the rise of the hydrogen economy, a water electrolysis device and a fuel cell having high efficiency are being developed.

For example, Korean Patent Registration Publication No. 10-1733492 discloses a non-noble water electrolysis catalyst including a cobalt-based compound fixed to a carbon support represented by formula 1 below, in which the cobalt-based compound is a nanoparticle surrounded by an amorphous layer with a thickness of 0.1 to 7 nm, the cobalt-based compound has a particle size of 5 to 30 nm, the catalyst is porous and has a nanoweb structure, and hydrogen and oxygen are produced at the cathode and the anode, respectively.

CoX/C [Formula 1]

As another example, Korean Patent Registration Publication No. 10-1281772 discloses a solid oxide fuel cell, which includes a cathode, an anode having a fuel gas inlet and a fuel gas outlet respectively positioned on both sides thereof, and an electrolyte including a solid oxide, in which the anode has a surface coated with a catalyst; the anode coated with the catalyst has a gradient having a catalyst density increasing or decreasing from the fuel gas inlet to the fuel gas outlet; and the catalyst includes a positive catalyst containing Ni, a negative catalyst containing Fe2O3, TiO2, Cr2O3, or a combination thereof, or a combination thereof.

SUMMARY OF THE INVENTION

One technical object of the present application is to provide a water electrolysis cell, a fuel cell, and a method for manufacturing the same.

Another technical object of the present application is to provide a water electrolysis cell, a fuel cell, and a method for manufacturing the same with a low manufacturing cost and a simple manufacturing process.

Still another technical object of the present application is to provide a water electrolysis cell, a fuel cell, and a method for manufacturing the same with high efficiency.

Still another technical object of the present application is to provide a water electrolysis cell and a method for manufacturing the same, which is operable at a low temperature.

Still another technical object of the present application is to provide a fuel cell and a method for manufacturing the same, which is operable at a high temperature.

The technical objects of the present application are not limited to the above.

To solve the above technical objects, the present application may provide an electrochemical element.

According to one embodiment, the electrochemical element may include an anode electrode, a cathode electrode on the anode electrode, and an anion exchange membrane disposed between the cathode electrode and the anode electrode and including cellulose and chitosan.

According to one embodiment, the cellulose of the anion exchange membrane may include bacterial cellulose.

According to one embodiment, the anion exchange membrane may include a network formed by base complex fibers combined with the cellulose and the chitosan.

According to one embodiment, the anion exchange membrane may include a first complex fiber in which a surface of the base complex fiber combined with the cellulose and the chitosan is oxidized, and a second complex fiber in which a surface of the base complex fiber is bound to a first functional group having nitrogen.

According to one embodiment, the first complex fiber and the second complex fiber may be crosslinked.

According to one embodiment, the anode electrode and the cathode electrode may include the same material.

According to one embodiment, at least one of the anode electrode and the cathode electrode may include a plurality of fibrillated fibers formed of a compound of copper, phosphorus and sulfur.

To solve the above technical objects, the present application may provide a water electrolysis cell.

According to one embodiment, the water electrolysis cell may include an electrochemical element according to the above-described embodiments.

To solve the above technical objects, the present application may provide a fuel cell.

According to one embodiment, the fuel cell may include an electrochemical element according to the above-described embodiments.

To solve the above technical objects, the present application may provide an anion exchange membrane for a water electrolysis cell or a fuel cell.

According to one embodiment, the anion exchange membrane for the water electrolysis cell or the fuel cell may include a network formed by base complex fibers containing chitosan.

According to one embodiment, the base complex fibers may include bacterial cellulose, and the chitosan bound to the bacterial cellulose.

According to one embodiment, the base complex fibers may include a first complex fiber in which a surface of the base complex fiber combined with the cellulose and the chitosan is oxidized, and a second complex fiber in which a surface of the base complex fiber is bound to a first functional group having nitrogen, in which a proportion of the first complex fiber is more than 30 wt % and less than 70 wt %, and a proportion of the second complex fiber is less than 70 wt % and more than 30 wt %.

According to one embodiment, an XPS analysis result may include peak values corresponding to pyrrolic, quaternary, and oxidized N in an N1s spectrum.

According to one embodiment, the anion exchange membrane may include a mixture of a crystalline phase and an amorphous phase.

According to one embodiment, the anion exchange membrane may have an ion conductivity of OH− ions controlled according to the content of the chitosan.

According to one embodiment, the anion exchange membrane may include a ratio of the chitosan in an amount of more than 30 wt % and less than 70 wt %.

An electrochemical element according to an embodiment of the present application may include an anode electrode, a cathode electrode, and an anion exchange membrane, in which the anion exchange membrane may include chitosan and cellulose. Accordingly, the anion exchange membrane may have a high $OH^-$ ion conductivity and excellent long-term stability.

In addition, at least one of the anode electrode and the cathode electrode may include a plurality of fibrillated fibers formed of a compound of a transition metal, phosphorus and sulfur. Accordingly, the anode electrode or the cathode electrode may have high electrochemical properties.

Thus, a water electrolysis cell or a fuel cell having high hydrogen generation efficiency and long life properties may be provided, and the water electrolysis cell and the fuel cell may be provided at low cost and with a simplified manufacturing process.

DETAILED DESCRIPTION OF THE EMBODIMENTS

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

Further, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. In addition, the term "connection" used herein may include the meaning of indirectly connecting a plurality of components, and directly connecting a plurality of components.

Further, in the following description of the present invention, a detailed description of known functions or configurations incorporated herein will be omitted when it may make the subject matter of the present invention unnecessarily unclear.

Figure 1:
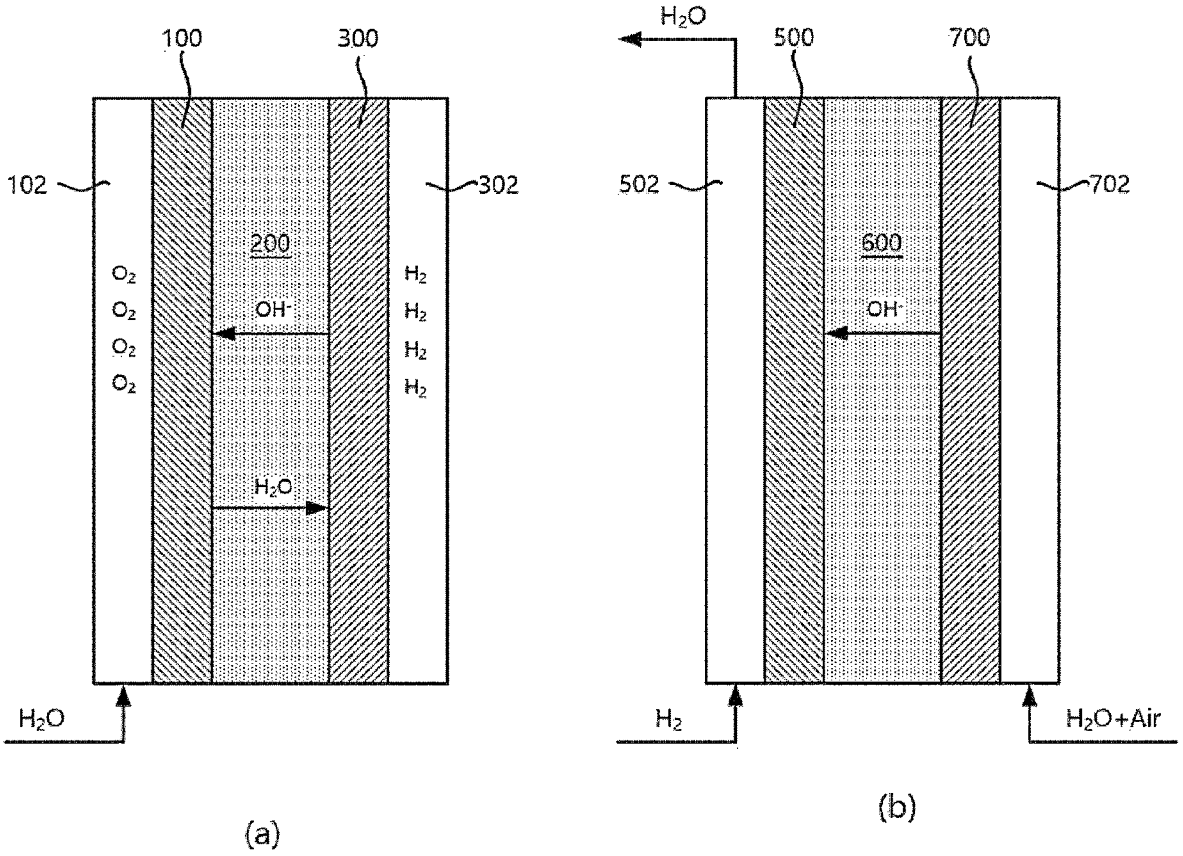
FIG. 1 is a view for explaining an electrochemical element according to an embodiment of the present application.

FIG. 1 is a view for explaining an electrochemical element according to an embodiment of the present application.

(a) of FIG. 1 shows a water electrolysis cell according to an embodiment of the present application, and (b) of FIG. 1 shows a fuel cell according to an embodiment of the present application.

Referring to (a) of FIG. 1, a water electrolysis cell according to an embodiment of the present application will be first described.

Referring to (a) of FIG. 1, a water electrolysis cell according to an embodiment of the present application may include an anode electrode 100, an anion exchange membrane 200 and a cathode electrode 300. The anion exchange membrane 200 may be disposed between the anode electrode 100 and the cathode electrode 300.

A first surface of the anode electrode 100 may come into contact with the anion exchange membrane 200, and a first gas diffusion layer 102 may be disposed on a second surface facing the first surface of the anode electrode 100.

In addition, a first surface of the cathode electrode 300 may come into contact with the anion exchange membrane 200, and a second gas diffusion layer 302 may be disposed on a second surface facing the first surface of the cathode electrode 300.

An external power source may supply power to the anode electrode 100 and the cathode electrode 300. By the power supplied by the external power source, oxygen gas may be generated from the anode electrode 100, and hydrogen gas may be generated from the cathode electrode 300.

Specifically, the alkaline water supplied through the first gas diffusion layer 102 may reach the cathode electrode 300 and then react with electrons supplied from the external power source to generate hydrogen and $OH^-$ ions as shown in <Formula 1> below, while $OH^-$ ions may move to the anode electrode 100 through the anion exchange membrane 200 to generate $H_2O$ and oxygen gas as shown in <Formula 2> below. Accordingly, as a whole, a reaction may be performed as shown in <Formula 3> below, and hydrogen gas may be generated.

$$2H_2O \rightarrow 2e^- + 2OH^- + H_2$$ <Formula 1>

$$2OH^- \rightarrow H_2O + 2e^- + \frac{1}{2}O_2$$ <Formula 2>

$$H_2O \rightarrow H_2 + \frac{1}{2}O_2$$ <Formula 3>

Hereinafter, the anode electrode 100, the anion exchange membrane 200, and the cathode electrode 300 included in the water electrolysis cell according to an embodiment of the present application will be described with reference to FIGS. 2 and 3.

Figure 2:
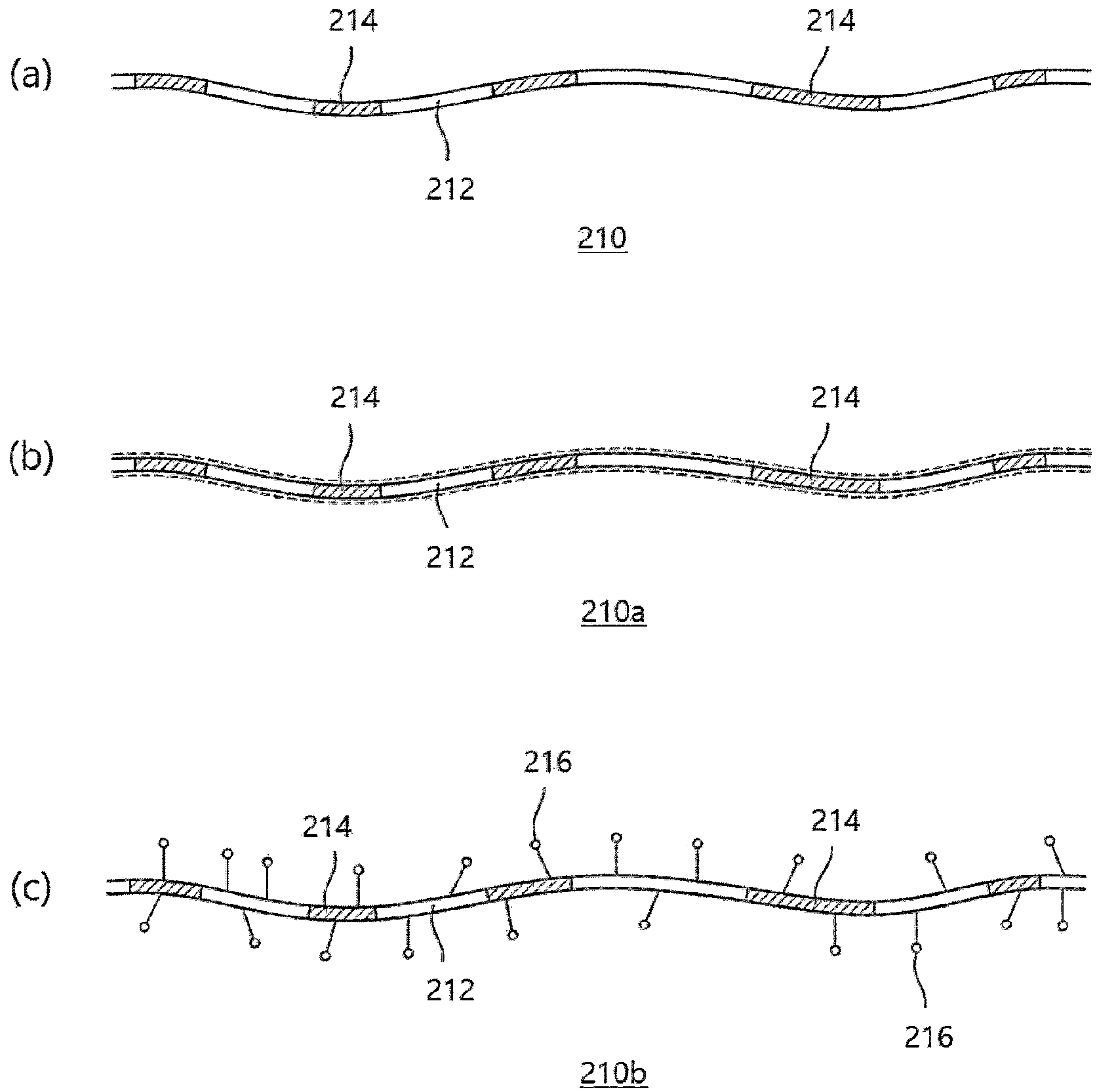
FIG. 2 is a view for explaining an anion exchange membrane included in an electrochemical element according to an embodiment of the present application, and a method for fabricating the same.

FIG. 2 is a view for explaining an anion exchange membrane included in an electrochemical element according to an embodiment of the present application, and a method for fabricating the same.

Referring to FIG. 2, a chitosan derivative may be prepared. The chitosan derivative may be obtained by mixing a chitosan precursor in a solvent. According to one embodiment, the chitosan derivative may be obtained by adding a solubilizing agent to chitosan chloride and a solvent. Accordingly, the chitosan chloride may be easily dissolved in a solvent, and the chitosan derivative may be easily provided in a medium to be described later, so that cellulose which chitosan is bound may be easily prepared.

For example, the solvent may be an aqueous acetic acid, and the solubilizing agent may include at least one of glycidyltrimethylammonium chloride, (2-aminoethyl)trimethylammonium chloride, (2-chloroethyl)trimethylammonium chloride, (3-carboxypropyl)trimethylammonium chloride, or (formylmethyl)trimethylammonium chloride.

The chitosan may have excellent thermal and chemical stability, have high ionic conductivity, and contain OH ions without a long-term loss. In addition, as will be described later, when used in the secondary battery the chitosan may have high compatibility with the anode electrode 100 and the cathode electrode 300 compound structure of copper, phosphorus, and sulfur.

Chitosan bound to cellulose may be produced from the chitosan derivative. The step of producing the cellulose to which the chitosan is bound may include: preparing a culture medium having the chitosan derivative; and injecting and culturing a bacterial strain in the culture medium to produce a base complex fiber 110 including a cellulose 212 to which the chitosan 214 is bound. In this case, the cellulose 212 may be bacterial cellulose.

According to one embodiment, the cellulose 212, to which the chitosan 214 is bound, may be prepared by culturing a bacterial pellicle in the culture medium and then desalting the bacterial pellicle. The bacterial pellicle may be prepared by preparing a culture medium containing the chitosan derivative together with raw materials (for example, pineapple juice, peptone, disodium phosphate, citric acid) for culturing yeast and bacteria, and injecting and culturing a strain. For example, the strain may be *Acetobacter xylinum.*

The base complex fiber 210 including the cellulose 212, to which the chitosan 214 is bound, may be prepared by washing and drying the cultured bacterial pellicle, desalting with an acidic solution (for example, HCl), neutralizing and removing a solvent. In the desalting process, the remaining Na, K, or cell shielding materials and debris may be removed, so that the cellulose 212, to which the chitosan 214 of high purity is bound, may be prepared.

In addition, the chitosan 214 may be chemically bound to the cellulose 212. Accordingly, in the cellulose 212 to which the chitosan 214 is bound, a stretching vibration corresponding to C—N may be observed during an XPS analysis.

According to one embodiment, the surface of the cellulose 112 to which the chitosan 214 is bound, that is, the surface of the base complex fiber 210 may be oxidized using an oxidizing agent, so that the first complex fiber **210*a*** may be prepared.

Specifically, the step of preparing a first complex fiber **210*a* may include the steps of: adding the base complex fiber 210 to an aqueous solution containing an oxidizing agent to prepare a source solution; adjusting the pH of the source solution to basic; adjusting the pH of the source solution to neutral; and washing and drying a pulp in the source solution to prepare the first complex fiber 210*a***.

For example, the aqueous solution containing the oxidizing agent may be an aqueous TEMPO solution. Alternatively, as another example, the aqueous solution containing the oxidizing agent may include at least one of 4-hydroxy-TEMPO, (diacetoxyiodo)benzene, 4-amino-TEMPO, 4-carboxy-TEMPO, 4-methoxy-TEMPO, TEMPO methacrylate, 4-acetamido-TEMPO, 3-carboxy-PROXYL, 4-maleimido-TEMPO, 4-hydroxy-TEMPO benzoate, or 4-phosphonooxy-TEMPO.

The source solution may further include a sacrificial reagent and an additional oxidizing agent for the oxidation reaction of the base complex fiber 210. For example, the sacrificial reagent may include at least one of NaBr, sodium iodide, sodium bromate, Sodium bromite, Sodium borate, sodium chlorite, or sodium chloride, and the additional oxidizing agent may include at least one of NaClO, potassium hypochlorite, lithium hypochlorite, sodium chlorite, sodium chlorate, perchloric acid, potassium perchlorate, lithium perchlorate, tetrabutylammonium perchlorate, zinc perchlorate, hydrogen peroxide, or sodium peroxide.

According to one embodiment, in the step of adjusting the pH of the source solution to be basic, the pH of the source solution may be adjusted to 10. Accordingly, the oxidation reaction may be easily induced while the precipitate is minimized, and a degree of oxidation of the first complex fiber 210*a* may be improved as compared to the reaction conditions at pH 8 to 9.

According to one embodiment, the additional oxidizing agent may be provided after the base complex fiber 210 and the sacrificial reagent are provided to the aqueous solution containing the oxidizing agent. In addition, the additional oxidizing agent may be provided by dropping. Accordingly, a rapid oxidation phenomenon of the base complex fiber 110 may be prevented, and as a result, the surface of the base complex fiber 210 may be uniformly and stably oxidized.

In addition, according to one embodiment, bromine may be bound to the surface of the cellulose 212 to which the chitosan 214 is bound, and a first functional group 216 containing nitrogen may be substituted with bromine, so that the second complex fiber 210*b* may be prepared.

The first functional group 216 may be represented as in <Formula 1> below, and the first functional group 216 may be bound with the chitosan 214 and/or the cellulose 212.

<Formula 1>

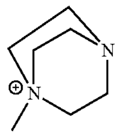

In other words, the second complex fiber 210*b* may have quaternary N.

Specifically, the step of preparing the second complex fiber 210*b* may include: dispersing the base complex fiber 210 in a first solvent and adding a bromine source to prepare a first source solution; adding a coupling agent to the first source solution and reacting to prepare a reaction suspension; filtering, washing and freeze-drying the reaction suspension to prepare a brominated base complex fiber; dispersing the brominated base complex fiber in a second solvent to prepare a second source solution; adding and reacting a precursor of the functional group 216 to the second source solution; filtering, washing, and freeze-drying the reacted solution to prepare the second complex fiber 210*b*.

For example, the first solvent and the second solvent may be the same as each other, and may include at least one of N,N-dimethylacetamide, acetamide, acetonitrile, ethanol, ethylenediamine, diethyl ether, or benzaldehyde.

For example, the bromine source may include at least one of LiBr, sodium bromide, or potassium bromide.

For example, the coupling agent may include N-bromosuccinimide and triphenylphosphine. Bromine can be easily bound to the surface of the base complex fiber 110 by the coupling agent. Specifically, bromine in N-bromosuccinimide may be bound with the base complex fiber 110, and triphenylphosphine may improve a reaction rate by reducing a bromine precursor (bromine source or N-bromosuccinimide).

As described above, after obtaining the brominated base complex fiber from the reaction suspension, the brominated base complex fiber may be freeze-dried. Accordingly, a loss of bromine in the brominated base complex fiber may be minimized, and secondary reaction of bromine with other elements may be minimized.

For example, the precursor of the first functional group 216 may include 1,4-diazabicyclo[2.2.2]octane.

An anion exchange membrane 200 may be prepared by using the cellulose 212 to which the chitosan 214 is bound.

The anion exchange membrane 200 may be prepared in the form of a membrane in which the base complex fiber 210 including the cellulose 212, to which the chitosan 214 is bound, forms a network. For this reason, the anion exchange membrane 200 may be provided with a plurality of pores therein, may have a high surface area, and may be excellent in flexibility and mechanical properties.

The anion exchange membrane 200 may be in a state in which a crystalline phase and an amorphous phase are mixed. More specifically, in the anion exchange membrane 200, the ratio of the amorphous phase may be higher than that of the crystalline phase. Accordingly, the anion exchange membrane 200 may have high ion mobility.

According to one embodiment, the anion exchange membrane 200 may be prepared by a gelatin process using the first complex fiber 210*a* and the second complex fiber 210*b*. In this case, the anion exchange membrane 200 may include the first complex fiber 210*a* and the second complex fiber 210*b*, but the first complex fiber 210*a* and the second complex fiber 110*b* may be cross-linked with each other. Due to the first complex fiber 210*a*, the number of OH ions in the anion exchange membrane 200 may be increased, ionic conductivity may be improved, a negative charge density may be increased, and swelling resistance may be improved. In addition, due to the second complex fiber 210*b*, a molecular weight may be increased to improve thermal stability, and ion exchange capacity may be improved to yield a high moisture impregnation rate and a high swelling resistance, improve cross-linking strength with the first complex fiber 210*a*, and provide a selectively high solubility (ion discerning selectivity) with regard to a specific solvent. Accordingly, the charge/discharge properties and life properties of the secondary battery including the anion exchange membrane 200 may be improved.

Specifically, the step of preparing the anion exchange membrane 200 may include the steps of: mixing the first complex fiber 210*a* and the second complex fiber 210*b* in a solvent to prepare a mixed solution; adding and reacting a crosslinking agent and an initiator to the mixed solution so as to prepare a suspension; casting and drying the suspension on a substrate to prepare a complex fiber membrane; and performing an ion exchange process on the complex fiber membrane.

For example, the solvent may include methylene chloride, 1,2-propanediol, acetone, and a mixed solvent thereof, the crosslinking agent may include glutaraldehyde, and the initiator may include N,N-diethyl-N-methyl-N-(2-methoxyethyl)ammonium bis(trifluoromethanesulfonyl)imide.

In addition, for example, an ion exchange process for the complex fiber membrane may include a step of providing a KOH aqueous solution and a ZnTFSI aqueous solution to the complex fiber membrane. Accordingly, the content of OH ions in the anion exchange membrane 200 may be improved.

As described above, according to an embodiment of the present application, the anion exchange membrane 200 may include the membrane, which has at least one of the base complex fiber 210, the first complex fiber 210*a*, or the second complex fiber 210*b*.

In the anion exchange membrane 200, the ratio of the chitosan 214 may be easily controlled depending on the content of the chitosan derivative provided in the culture medium. Depending on the ratio of the chitosan 214, the crystallinity, ionic conductivity, and swelling ratio of the anion exchange membrane 200 may be controlled. Specifically, as the ratio of the chitosan 214 increases, the crystallinity of the anion exchange membrane 200 may gradually decrease.

According to one embodiment, the content of the chitosan 214 may be more than 30 wt % and less than 70 wt %. If the content of the chitosan 214 is 30 wt % or less, or 70 wt % or more, the ionic conductivity of the anion exchange membrane 200 may be remarkably lowered, and the swelling rate may be remarkably increased.

However, according to an embodiment of the present application, the ratio of the chitosan 214 in the anion exchange membrane 200 may be more than 30 wt % and less than 70 wt %, and thus the anion exchange membrane 200 may have a low swelling ratio value while maintaining high ionic conductivity properties.

Figure 3:
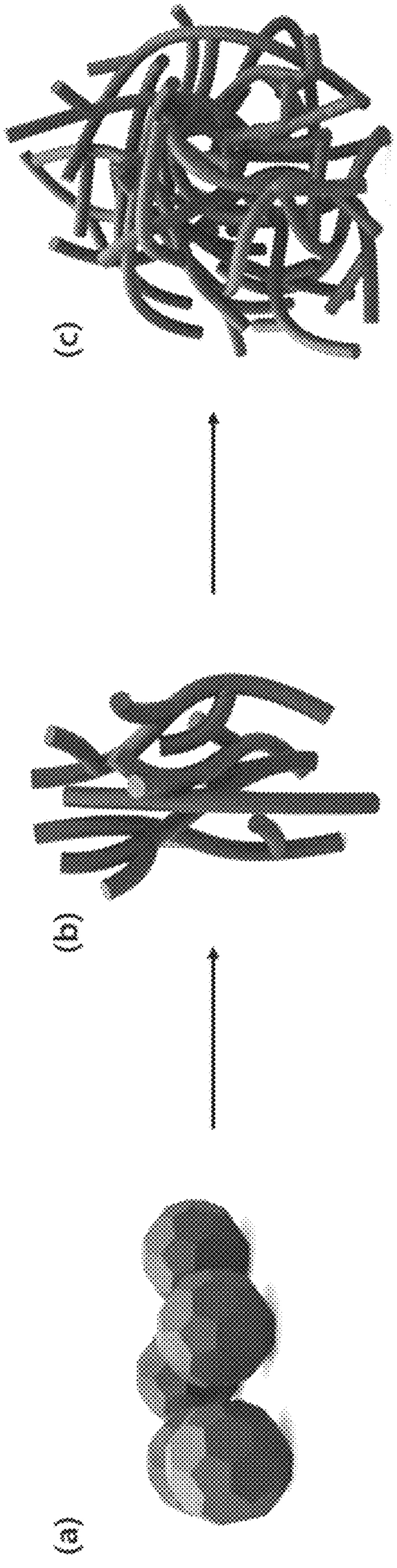
FIG. 3 is a view for explaining anode/cathode electrodes included in an electrochemical element according to an embodiment of the present application, and a method for fabricating the same.

FIG. 3 is a view for explaining anode/cathode electrodes included in an electrochemical element according to an embodiment of the present application, and a method for fabricating the same.

Referring to FIG. 3, at least one of the anode electrode 100 or the cathode electrode 300, as described with reference to FIG. 1, may be formed of a compound of a transition metal, a chalcogen element, phosphorus. Hereinafter, the anode electrode 100 or the cathode electrode 300, and a method for fabricating the same will be described.

A first precursor having a chalcogen element, a second precursor having phosphorus, and a third precursor having a transition metal may be prepared.

According to one embodiment, the chalcogen element may include phosphorus. In this case, for example, the first precursor may include at least any one of dithiooxamide, dithiobiuret, dithiouracil, acetylthiourea, thiourea, N-methylthiourea, bis(phenylthio)methane, 2-imino-4-thiobiuret, N,N' ammonium sulfide, methyl methanesulfonate, sulfur powder, sulphates, N,N-dimethylthioformamide, or davy reagent methyl.

Alternatively, according to another embodiment, the chalcogen element may include at least any one of oxygen, selenium, or tellurium.

For example, the second precursor may include at least any one of tetradecylphosphonic acid, ifosfamide, octadecylphosphonic acid, hexylphosphonic acid, trioctylphosphine, phosphoric acid, triphenylphosphine, ammonium phosphide, pyrophosphates, davy reagent methyl, cyclophosphamide monohydrate, phosphorus trichloride, phosphorus(V) oxychloride, thiophosphoryl chloride, phosphorus pentachloride, or phosphorus pentasulfide.

According to one embodiment, different heterogeneous types including phosphorus may be used as the second precursor. For example, a mixture of tetradecylphosphonic acid and ifosfamide at a ratio of 1:1 (M %) may be used as the second precursor. Accordingly, a stoichiometric ratio of the transition metal, phosphorus, and the chalcogen element may be controlled to 1:1:1. As a result, as will be described later, the anode electrode 100 and the cathode electrode 300 according to an embodiment of the present application may have a covellite structure, and the electrochemical properties the anode electrode 100 and the cathode electrode 300 may be improved.

According to one embodiment, the transition metal may include copper. In this case, for example, the third precursor may include at least any one of copper chloride, copper(II) sulfate, copper(II) nitrate, copper selenide, copper oxychloride, cupric acetate, copper carbonate, copper thiocyanate, copper sulfide, copper hydroxide, copper naphthenate, or copper(II) phosphate.

Alternatively, according to another embodiment, the transition metal may include at least any one of copper, magnesium, manganese, cobalt, iron, nickel, titanium, zinc, aluminum, or tin.

A mixture may be prepared by mixing the first precursor, the second precursor, and the third precursor, and adding a first reducing agent.

The first precursor, the second precursor, and the third precursor may be mixed in solvent and the first reducing agent may be added. For example, the solvent may be a mixture of ethanol and ethylenediamine. Alternatively, for example, the solvent may be a mixture of ethanol and toluene.

According to one embodiment, the direction of the crystal plane of the electrode structure to be described later may be controlled according to the type and mixing ratio of the solvent. In other words, according to the type and mixing ratio of the solvent, whether the crystal plane 101 is developed or not in the anode electrode 100 and the cathode electrode 300 may be controlled, and thus the electrochemical properties of the positive electrode 300 may be controlled.

According to an embodiment of the present application, the solvent may be selected (for example, mixing ethanol and ethylenediamine at a volume ratio of 1:3) so that a crystal plane may be developed in the anode electrode 100 and the cathode electrode 300, thereby improving the electrochemical properties (for example, ORR, OER, HER) of the anode electrode 100 and the cathode electrode 300.

After the first precursor, the second precursor, and the third precursor are mixed in the solvent, nucleation and crystallization may proceed as shown in (a) of FIG. 3.

For example, the first reducing agent may include at least any one of ammonium hydroxide, ammonium chloride, or tetramethylammonium hydroxide.

An intermediate product including a plurality of stems may be prepared by co-precipitating the mixture including the first precursor, the second precursor, the third precursor, the first reducing agent, and the solvent.

The mixture may be heat treated to form an intermediate product, as shown in (b) of FIG. 3. The intermediate product may have a plurality of stems, and the plurality of stems may form a network with each other.

For example, the mixture to which the first reducing agent is added may be heat treated under reflux at 120° C., and then washed with deionized water and ethanol.

The first reducing agent may maintain pH and increase a reaction rate while performing a function of the reducing agent during heat treatment. Accordingly, the intermediate product having the plurality of stems may be easily absorbed. For example, when the transition metal is copper and the chalcogen element is sulfur, the intermediate structure may be CuPS having a covellite crystal structure.

A plurality of branches may branch off from the plurality of stems according to a method of adding a second reducing agent to the intermediate product and performing heat treatment under pressure, so as to prepare a plurality of fibrillated fibers including the transition metal, the chalcogen element, and phosphorus.

According to one embodiment, the intermediate product and the second reducing agent may be added to deionized water, and then a pressure heat treatment process may be performed.

For example, the second reducing agent may include at least any one of triton X-165, triton X-102, triton X-45, triton X-114, triton X-405, triton X-101, trimesic acid, diamide, peroxynitrite, formaldehyde, thimerosal, or chloramine-T.

According to one embodiment, a chalcogen element source having the chalcogen element may be further added along with the second reducing agent. Accordingly, the chalcogen element lost in the reaction process may be supplemented by the chalcogen element source, and the electrode structure having a sponge structure in which a plurality of fibrillated fibers to be described later form a network may be easily formed.

For example, when the chalcogen element is sulfur, the chalcogen element source may include at least any one of sodium bisulfite, sodium sulfate, sodium sulfide, sodium thiosulfate, sodium thiomethoxide, sodium ethanethiolate, or sodium methanethiolate.

A process of mixing the intermediate product and the second reducing agent in deionized water may be performed in a cooled state. The reaction rate may be prevented from excessively increasing due to the heat generated in the process of adding the second reducing agent, thereby improving the electrochemical properties of the anode electrode 100 and the cathode electrode 300.

As described above, a plurality of branches may branch off from the plurality of stems as shown in (c) of FIG. 3 by adding a second reducing agent to the intermediate product and performing heat treatment under pressure, and thus the anode electrode 100 and the cathode electrode 300 having a sponge structure in which a plurality of fibers form a network may be formed.

The anode electrode 100 and the cathode electrode 300 having a sponge structure may be immersed in liquid nitrogen after being washed with deionized water and ethanol. Accordingly, mechanical properties and flexibility of the anode electrode 100 and the cathode electrode 300 of the sponge structure may be improved.

In addition, after being immersed in liquid nitrogen, the anode electrode 100 and the cathode electrode 300 of the sponge structure may be freeze-dried, and the remaining solvents may be removed to minimize a secondary reaction.

The anode electrode 100 and the cathode electrode 300 may include a membrane of a sponge structure, in which a plurality of branches branch off from the plurality of stems and a plurality of fibers form a network as described above. Accordingly, the anode electrode 100 and the cathode electrode 300 may have a porous structure in which a plurality of pores having a size of 1 to 2 nm are provided, and may be flexible.

In addition, as described above, the type and ratio of the solvent mixed with the first precursor, the second precursor, and the third precursor may be controlled and thus a crystal plane 101 may be developed in the anode electrode 100 and the cathode electrode 300. Accordingly, upon the XRD analysis of the anode electrode 100 and the cathode electrode 300, a peak value corresponding to a crystal plane 101 may have a maximum value compared with a peak value corresponding to another crystal plane. Upon the XRD measurement, a peak value corresponding to a crystal plane 101 may be observed in a range of 2θ values of 19° to 21°.

The plurality of fibers forming the anode electrode 100 and the cathode electrode 300 may include a compound of the transition metal, phosphorus, and the chalcogen element. For example, when the transition metal is copper and the chalcogen element is oxygen, the fiber may be represented by the following <Formula 1>.

CuPxSy <Formula 1>

When the fiber forming the anode electrode 100 and the cathode electrode 300 is represented as above <Formula 1>, it may be $x+y=1$, $0.3 \leq x \leq 0.7$, $0.3 \leq y \leq 0.7$.

If, in above <Formula 1>, x is less than 0.3 or more than 0.7 and y is less than 0.3 or more than 0.7, ORR, OER, and HER properties of the anode electrode 100 and the cathode electrode 300 may be deteriorated.

However, according to an embodiment of the present application, when the anode electrode 100 and the cathode electrode 300 are represented by CuPxSy, a composition ratio of P may be 0.3 or more and 0.7 or less and a composition ratio of S may be 0.3 or more and 0.7 or less. Accordingly, the ORR, OER, and HER properties of the anode electrode 100 and the cathode electrode 300 may be improved, and property of the water split cell, which includes the anode electrode 100 and the cathode electrode 300, may be improved.

According to an embodiment of the present application, the anode electrode 100 and the cathode electrode 300 having a membrane shape in which the plurality of fibrillated fibers form a network according to a method of mixing the first precursor having the chalcogen element, the second precursor having phosphorus, and the third precursor having the transition metal.

The anode electrode 100 and the cathode electrode 300 having high electrochemical properties may be prepared by an inexpensive method.

In addition, the anode electrode 100 and the cathode electrode 300 may be fabricated by co-precipitation and heat treatment under pressure, and thus may be easily mass-produced and subjected to a simple fabrication process, thereby providing the anode electrode 100 and the cathode electrode 300 for the water split cell.

The water electrolysis cell according to an embodiment of the present application may include the anode electrode 100, the cathode electrode 300, and the anion exchange membrane 200, in which the anion exchange membrane 200 may include chitosan and cellulose. Accordingly, the anion exchange membrane 200 may have a high OH− ion conductivity and excellent long-term stability.

In addition, at least one of the anode electrode 100 and the cathode electrode 300 may include a plurality of fibrillated fibers formed of a compound of a transition metal, phosphorus and sulfur. Accordingly, the anode electrode 100 or the cathode electrode 300 may have high electrochemical properties.

Thus, the water electrolysis cell having high hydrogen generation efficiency and long life properties may be provided, and the water electrolysis cell may be provided at low cost and with a simplified manufacturing process.

Then, a fuel cell according to an embodiment of the present application will be described with reference to (b) of FIG. 1.

Referring to (b) of FIG. 1, a fuel cell according to an embodiment of the present application may include an anode electrode 500, an anion exchange membrane 600 and a cathode electrode 700. The anion exchange membrane 600 may be disposed between the anode electrode 500 and the cathode electrode 700.

A first surface of the anode electrode 500 may come into contact with the anion exchange membrane 600, and a first gas diffusion layer 502 may be disposed on a second surface facing the first surface of the anode electrode 500.

In addition, a first surface of the cathode electrode 700 may come into contact with the anion exchange membrane 600, and a second gas diffusion layer 702 may be disposed on a second surface facing the first surface of the cathode electrode 700.

Hydrogen gas may be supplied to the first gas diffusion layer 502, and the power generated during an oxidation of the hydrogen gas may be transferred to an external load.

Specifically, when hydrogen gas is supplied to the first gas diffusion layer 502 and water and air are supplied to the second gas diffusion layer 702, or when high-purity oxygen gas is supplied instead of air, OH− ions may be generated in the cathode electrode 700 as shown in <Formula 6> below, and the OH− ions may move to the anode electrode 100 through the anion exchange membrane 200, so that water and electrons may be generated as shown in <Formula 7> and the electrons generated in the anode electrode 100 may be applied to the external load. Accordingly, as a whole, a reaction may be performed as shown in <Formula 8> below, and electric power gas may be generated.

$$\frac{1}{2}O_2+H_2O+2e^- \rightarrow 2OH^- \quad \text{<Formula 6>}$$

$$H_2+2OH^- \rightarrow 2H_2O+2e^- \quad \text{<Formula 7>}$$

$$H_2+\frac{1}{2}O_2 \rightarrow H_2O \quad \text{<Formula 8>}$$

Then, the anode electrode 500, the anion exchange membrane 600, and the cathode electrode 700 included in the fuel cell according to an embodiment of the present application will be described.

The anion exchange membrane 600 may be fabricated as described with reference to FIG. 2.

At least one of the anode electrode 500 or the cathode electrode 700 may be formed of a compound of a transition metal, a chalcogen element, and phosphorus as described with reference to FIG. 3.

Accordingly, the fuel cell according to an embodiment of the present application may include the anode electrode 500, the cathode electrode 700, and the anion exchange membrane 600, in which the anion exchange membrane 600 may include chitosan and cellulose. Accordingly, the anion exchange membrane 600 may have a high $OH^-$ ion conductivity and excellent long-term stability even at a high temperature.

In addition, at least one of the anode electrode 500 and the cathode electrode 700 may include a plurality of fibrillated fibers formed of a compound of a transition metal, phosphorus and sulfur. Accordingly, the anode electrode 500 or the cathode electrode 700 may have high electrochemical properties.

Thus, the fuel cell having high electric power generation efficiency and long life properties may be provided, and the fuel cell may be provided at low cost and with a simplified manufacturing process.

Hereinafter, specific experimental embodiments and the results of evaluating properties will be described with regard to an electrochemical element according to an embodiment of the present invention.

Preparing of Base Complex Fiber (CBC) According to Experimental Example 1-1

*Acetobacter xylinum* was provided as a bacterial strain, and a chitosan derivative was provided. The chitosan derivative was prepared by dissolving 1 g of chitosan chloride in 1% (v/v) aqueous acetic acid, treating with 1 M glycidyltrimethylammonium chloride at 65° C. for 24 hours in an N2 atmosphere, precipitating, filtering multiple times with ethanol.

A Hestrin-Schramm (HS) culture medium containing pineapple juice (2% w/v), yeast (0.5% w/v), peptone (0.5% w/v), disodium phosphate (0.27% w/v), citric acid (0.015% w/v), and chitosan derivative (2% w/v) was prepared and steam-sterilized at 121° C. for 20 minutes. In addition, *Acetobacter xylinum* was activated in a pre-cultivation Hestrin-Schramm (HS) culture medium at 30° C. for 24 hours, and acetic acid was added to maintain pH 6.

After that, *Acetobacter xylinum* was cultured in the Hestrin-Schramm (HS) culture medium at 30° C. for seven days.

The harvested bacterial pellicle was washed with deionized water to neutralize the pH of the supernatant and dehydrated in vacuum at 105° C. The resulting cellulose was demineralized by using 1 N HCl for 30 minutes (mass ratio 1:15, w/v) to remove an excessive amount of reagent, and then was purified by centrifugation several times with deionized water until the supernatant reached a neutral pH. Finally, all solvents were evaporated at 100° C. to prepare a base complex fiber (chitosan-bacterial cellulose (CBC)).

Preparing of First Complex Fiber (oCBC) According to Experimental Example 1-2

Figure 4:
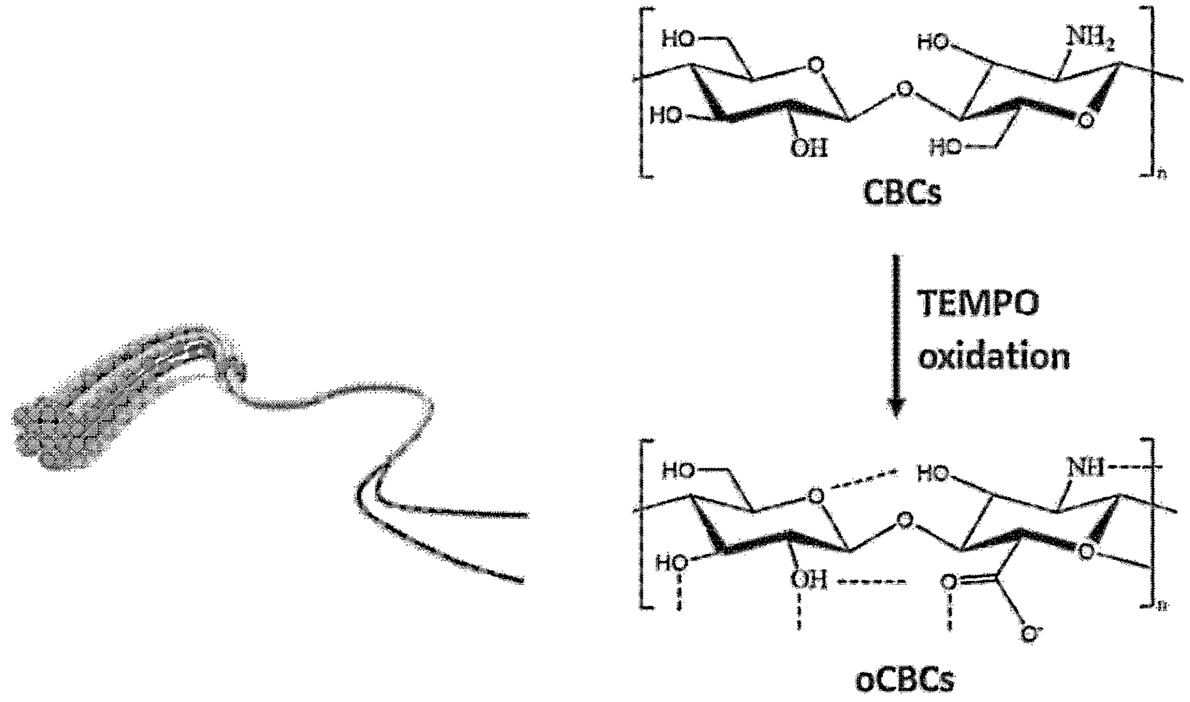
FIG. 4 is a view for explaining a process of preparing a first complex fiber according to Experimental Example 1-2 of the present application.

FIG. 4 is a view for explaining a process of preparing a first complex fiber according to Experimental Example 1-2 of the present application.

A first complex fiber (TEMPO-oxidized CBC (oCBCs)), in which a surface of the base complex fiber is oxidized, was designed according to a method of conjugating a base complex fiber (CBC) of hydroxymethyl and ortho-para directing acetamido to the oxide of TEMPO by an oxidation reaction using 2,2,6,6-tetramethylpiperidine-1-oxyl (TEMPO), sodium bromide (NaBr) and sodium hypochlorite (NaClO) as shown in FIG. 4.

Specifically, 2 g of the base complex fiber dispersed in a 2 mM TEMPO aqueous solution was reacted with NaBr (1.9 mM). 5 mM NaClO was used as an additional oxidizing agent.

The reaction suspension was stirred with ultrasonic waves, and the reaction was allowed to proceed at room temperature for three hours. The pH of the suspension was maintained at 10 by successive addition of 0.5M NaOH solution. Then, 1N HCl was added to the suspension to keep the pH neutral for three hours. The oxidized pulp produced in the suspension was washed three times with 0.5 N HCl, and the supernatant was brought to a neutral pH with deionized water.

The washed pulp was exchanged with acetone and toluene for 30 minutes and dried to evaporate the solvent, and finally a first complex fiber (oCBC) fiber was obtained.

As can be understood from FIG. 4, the surface of the base complex fiber may be oxidized.

Preparing of Second Complex Fiber (qCBC) According to Experimental Example 1-3

Figure 5:
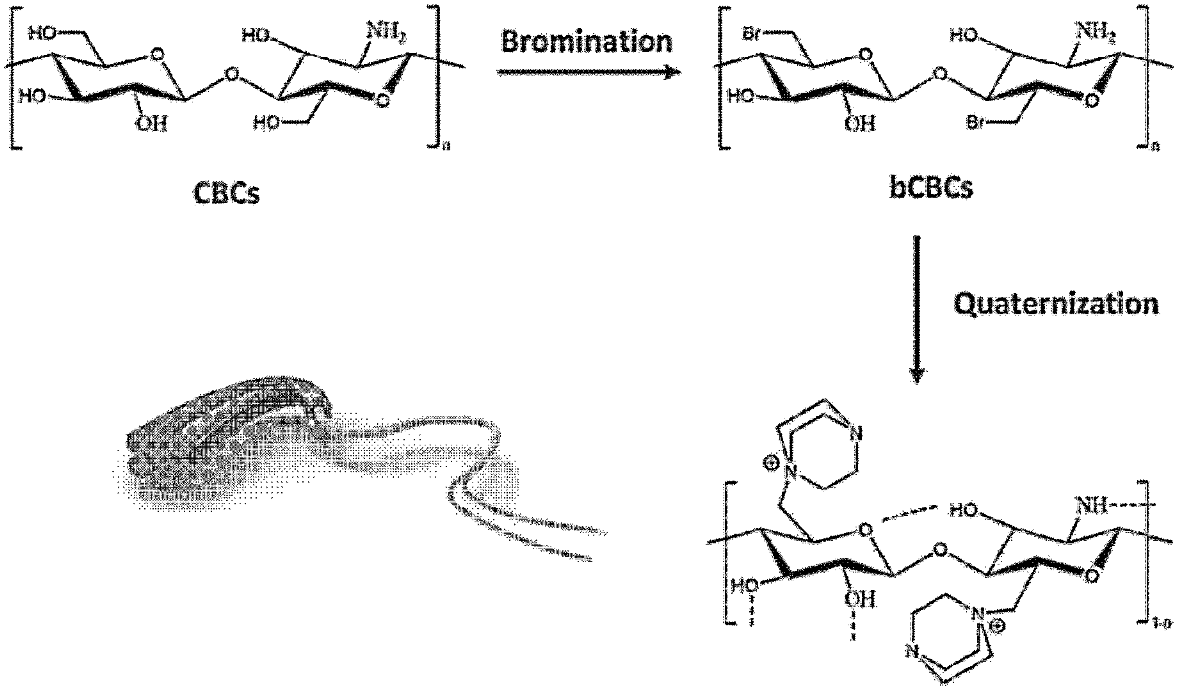
FIG. 5 is a view for explaining a process of preparing a second complex fiber according to Experimental Example 1-3 of the present application.

FIG. 5 is a view for explaining a process of preparing a second complex fiber according to Experimental Example 1-3 of the present application.

A second complex fiber (covalently quaternized CBC (qCBC)), in which a first functional group having nitrogen is bound to the base complex fiber, was prepared according to a method of conjugating a brominated base complex fiber (CBC) and a quaternary amine group by a coupling agent using 1,4-diazabicyclo[2.2.2]octane, as shown in FIG. 5.

Specifically, 1 g of the base complex fiber dispersed in N,N-dimethylacetamide (35 ml) solution was reacted with LiBr (1.25 g) suspension while stirring for 30 minutes.

N-bromosuccinimide (2.1 g) and triphenylphosphine (3.2 g) were used as a coupling agent. The two reaction mixtures were stirred for 10 minutes and reacted at 80° C. for 60 minutes.

Then, the reaction suspension was cooled to room temperature, added to deionized water, filtered, rinsed with deionized water and ethanol, and freeze-dried to obtain a brominated base complex fiber (bCBC) fiber.

The brominated base complex fiber was dissolved in 100 ml of N,N-dimethylformamide, and reacted with 1.2 g of 1,4-diazabicyclo[2.2.2]octane.

After that, the mixture was subjected to ultrasonic treatment for 30 minutes, and then reacted at room temperature for 24 hours. The resulting solution was mixed with diethyl ether, washed five times with diethyl ether/ethyl acetate, and freeze-dried to obtain a second complex fiber (covalently quaternized CBC (qCBC)).

As can be understood from FIG. 5, it can be confirmed that the first functional group having nitrogen is bound to the surface of the base complex fiber.

Fabricating of Anion Exchange Membranes (CBCs) According to Experimental Examples 1-4 to 1-8

Preparing of Anion Exchange Membrane (CBCs) According to Experimental Example 1-4

Figure 6:
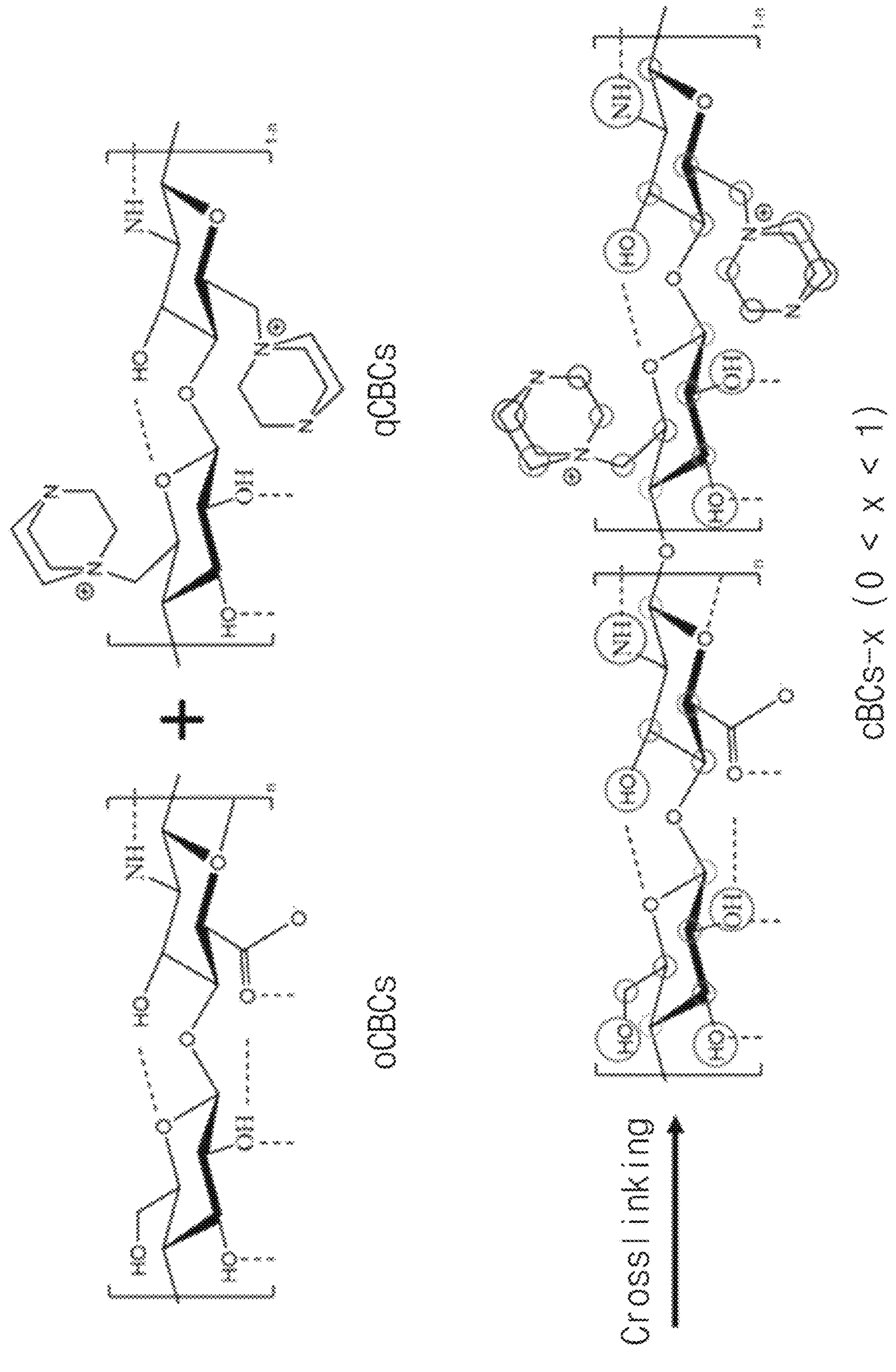
FIG. 6 is a view for explaining a method for fabricating an anion exchange membrane according to an experimental example of the present application.

FIG. 6 is a view for explaining a method for fabricating an anion exchange membrane according to an experimental example of the present application.

Figure 12:
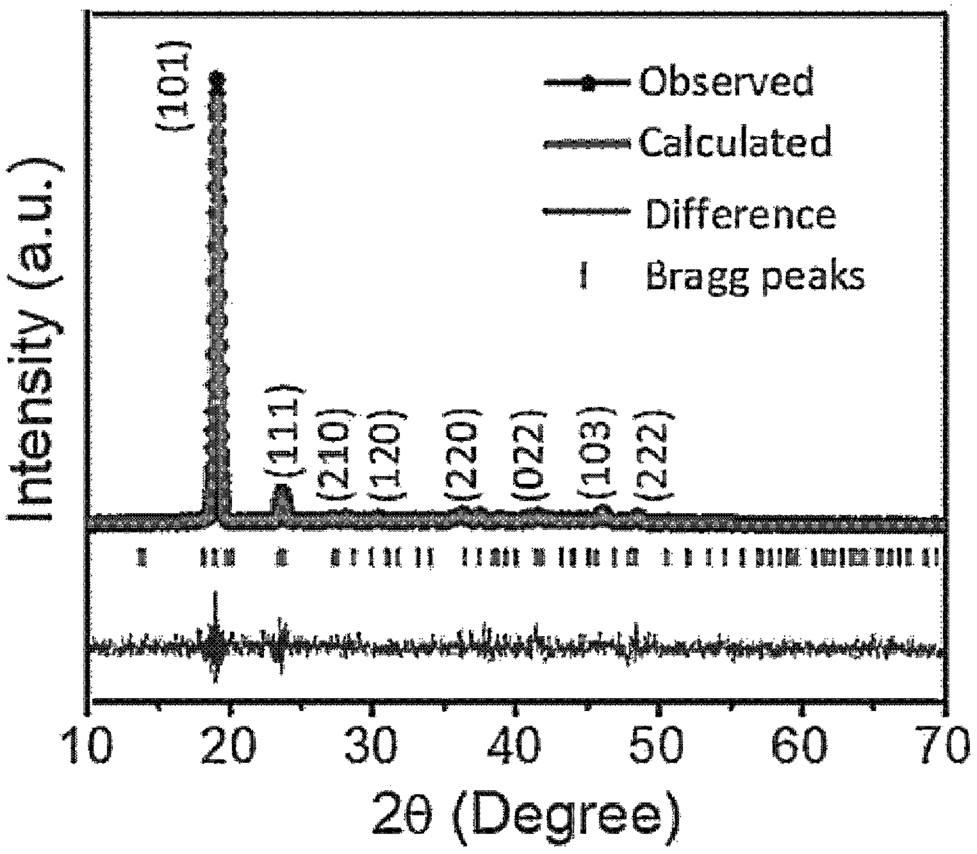
FIG. 12 is an XRD graph of an electrode fabricated according to Experimental Example 3 of the present application.

An anion exchange membrane was prepared by a gelatin process using the first complex fiber (oCBC) and the second complex fiber (qCBC), as shown in FIG. 12. Specifically, the first complex fiber (oCBC) and the second complex fiber (qCBC) were dissolved in a mixture of methylene chloride, 1,2-propanediol and acetone (8:1:1 v/v/v %) at the same weight ratio by using ultrasonic waves, and then 1 wt % of glutaraldehyde as a crosslinking agent and 0.3 wt % of N,N-diethyl-N-methyl-N-(2-methoxyethyl)ammonium bis (trifluoromethanesulfonyl)imide as an initiator were added.

Bubbles were removed from the gel suspension by using a vacuum chamber (200 Pa), and casted on a glass at 60° C. for six hours. The complex fiber membrane was peeled off while coagulating with deionized water, rinsed with deionized water, and vacuum dried.

A anion exchange membrane (CBCs) was prepared by an ion exchange with 1 M KOH aqueous solution and 0.1 M ZnTFSI at room temperature for six hours, respectively. After that, washing and immersion processes were performed with deionized water in an N2 atmosphere in order to avoid a reaction with CO2 and a formation of carbonate.

As can be understood from FIG. 12, it can be confirmed that the first complex fibers (oCBC) and the second complex fibers (qCBC) are crosslinked to each other to form the anion exchange membrane (CBCs). OH ions are hopping (grotthuss transport) on the surfaces of the first complex fiber (oCBC) and the second complex fiber (qCBC) crosslinked in the anion exchange membrane (CBCs), and may move through diffusion in the interior spaced apart from the surfaces of the first complex fiber and the second complex fiber. In addition, anion exchange membrane (CBCs) may have an amorphous phase and thus may have high ionic conductivity compared to a crystalline structure.

In the process of preparing the anion exchange membrane (CBCs), a ratio of the first complex fiber (oCBC) and the second complex fiber (qCBC) was adjusted as shown in <Table 1> below.

TABLE 1

| Classification | First complex fiber | Second complex fiber |
|---|---|---|
| Experimental Example 1-4 | 10 wt % | 90 wt % |
| Experimental Example 1-5 | 30 wt % | 70 wt % |
| Experimental Example 1- 6 | 50 wt % | 50 wt % |
| Experimental Example 1-7 | 70 wt % | 30 wt % |
| Experimental Example 1-8 | 90 wt % | 10 wt % |

Fabrication of Anion Exchange Membranes According to Experimental Examples 1-9 to 1-13

According to Experimental Example 1-1 described above, a base complex fiber was prepared, but base complex fibers having different chitosan contents were prepared by adjusting an addition ratio of the chitosan derivative. After that, according to Experimental Example 1-6 described above, an anion exchange membrane according to Experimental Examples 1-9 to 1-13 was fabricated by using base complex fibers having different chitosan contents as shown in <Table 2>.

TABLE 2

| Classification | Ratio of chitosan |
|---|---|
| Experimental Example 1-9 | 10 wt % |
| Experimental Example 1-10 | 30 wt % |
| Experimental Example 1-11 | 50 wt % |
| Experimental Example 1-12 | 70 wt % |
| Experimental Example 1-13 | 90 wt % |

Fabrication of Electrode According to Experimental Example 2

Dithiooxamide was prepared as a first precursor having sulfur, a mixture of tetradecylphosphonic acid and ifosfamide (1:1 M %) was prepared as a second precursor having phosphorus, copper chloride was prepared as a third precursor having copper, and a mixture of ethanol and ethylenediamine (1:3 v/v %) was prepared as a solvent.

The first to third precursors were added to the solvent and stirred to prepare a suspension.

After that, 2.5 M % ammonium hydroxide was added as a first reducing agent, stirred for two hours, and heat treated at 120° C. for six hours, after which an intermediate product was obtained, washed with deionized water and ethanol, and dried under vacuum at 50° C.

In an ice bath, the intermediate product was mixed and stirred in 20 ml of deionized water with Triton X-165 as a secondary reducing agent and sodium bisulfite as an elemental sulfur source. After that, heat treatment was performed under pressure at 120° C. for 24 hours to prepare a membrane which is formed of a compound of copper, phosphorus, and sulfur and in which a plurality of fibrillated fibers form a network.

The membrane was washed with deionized water and ethanol to adjust to neutral pH, stored at −70° C. for two hours, immersed in liquid nitrogen, and freeze-dried in vacuum, so as to prepare a CuPS electrode structure according to Experimental Example 1 in which a crystal plane 101 is developed.

In the process of fabricating the electrode structure according to Experimental Example 1, a ratio of the first precursor having sulfur and the second precursor having phosphorus was controlled to adjust a ratio of P and S in CuPS at 0.1:0.9, 0.2:0.8, 03:0.7, 0.5:0.5, 0.7.0.3, and 0.9:0.1, respectively.

Figure 7:
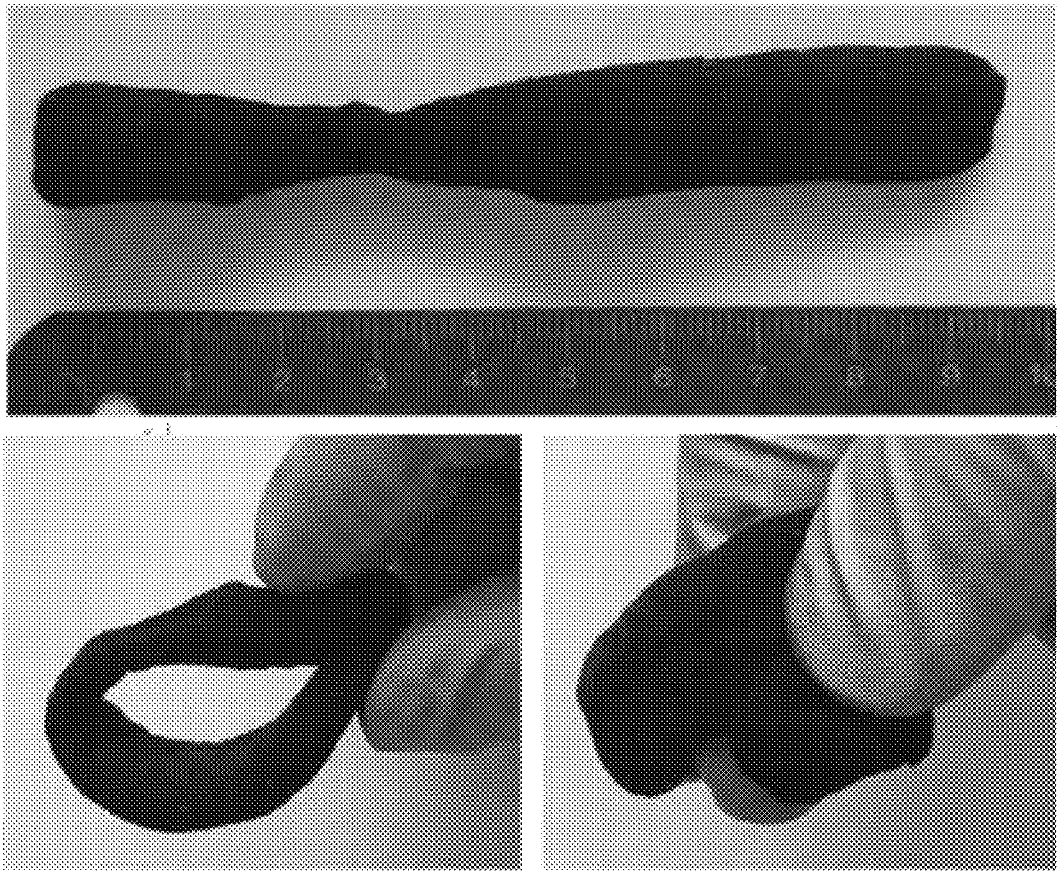
FIG. 7 is a picture of an electrode according to Experimental Example 3 of the present application.

FIG. 7 is a picture of a positive electrode according to Experimental Example 3 of the present application.

Referring to FIG. 7, the positive electrode ($CuP_{0.5}S_{0.5}$) prepared according to Experimental Example 2 described above was photographed. It can be confirmed that the positive electrode according to Experimental Example 2 has a length of about 10 cm and is flexible.

Fabrication of Water Electrolysis Cell According to Experimental Example 3-1

A water electrolysis cell according to Experimental Example 3-1 was fabricated by using the electrode ($CuP_{0.5}S_{0.5}$) according to Experimental Example 2 as an anode electrode and a cathode electrode, and using the anion exchange membrane of Experimental Example 1-6.

Fabrication of Water Electrolysis Cell According to Experimental Example 3-2

A water electrolysis cell according to Experimental Example 3-2 was fabricated by using the electrode ($CuP_{0.5}S_{0.5}$) according to Experimental Example 2 as an anode electrode, using Pt (50 wt %), Ru (25 wt %), and carbon (25 wt %) as a cathode electrode, and using the anion exchange membrane of Experimental Example 1-6.

Fabrication of Water Electrolysis Cell According to Experimental Example 3-3

A water electrolysis cell according to Experimental Example 3-3 was fabricated by using $IrO_2$ as an anode electrode, using Pt as a cathode electrode, and using the anion exchange membrane of Experimental Example 1-6.

Fabrication of Water Electrolysis Cell According to Experimental Example 3-4

A water electrolysis cell according to Experimental Example 3-4 was fabricated by using the electrode ($CuP_{0.5}S_{0.5}$) according to Experimental Example 2 as an anode electrode, using Pt (50 wt %), Ru (25 wt %), and carbon (25 wt %) as a cathode electrode, and using a commercially available A201 membrane as the anion exchange membrane.

Fabrication of Water Electrolysis Cell According to Experimental Example 3-5

A water electrolysis cell according to Experimental Example 3-5 was fabricated by using $IrO_2$ as an anode electrode, using Pt (50 wt %), Ru (25 wt %), and carbon (25 wt %) as a cathode electrode, and using a commercially available A201 membrane as the anion exchange membrane.

A structure of the water electrolysis cell according to Experimental Examples 3-1 to 3-5 may be summarized as shown in <Table 3> below.

TABLE 3

| Classification | Anode electrode | Anion exchange membrane | Cathode electrode |
|---|---|---|---|
| Experimental Example 3-1 | CuPS | CBCs | CuPS |
| Experimental Example 3-2 | CuPS | CBCs | PtRu |
| Experimental Example 3-3 | $IrO_2$ | CBCs | Pt |
| Experimental Example 3-4 | CuPS | A201 | PtRu |
| Experimental Example 3-5 | $IrO_2$ | A201 | Pt |

Fabrication of Fuel Cell According to Experimental Example 4-1

A fuel cell according to Experimental Example 4-1 was fabricated by using the electrode ($CuP_{0.5}S_{0.5}$) according to Experimental Example 2 as a cathode electrode, using Pt of 150 $ugcm^{-2}$ as an anode electrode, and using the anion exchange membrane of Experimental Example 1-6.

Fabrication of fuel cell according to Experimental Example 4-2

A fuel cell according to Experimental Example 4-2 was fabricated by using Pt/C as an anode electrode, using Ag as a cathode electrode, and using the anion exchange membrane of Experimental Example 1-6.

Fabrication of Fuel Cell According to Experimental Example 4-3

A fuel cell according to Experimental Example 4-3 was fabricated in the same manner as shown in Experimental Example 4-1, except for using commercially available Nafion instead of the anion exchange membrane of Experimental Example 1-6.

A structure of the fuel cell according to Experimental Examples 4-1 to 4-3 may be summarized as shown in <Table 4> below.

TABLE 4

| Classification | Anode electrode | Anion exchange membrane | Cathode electrode |
|---|---|---|---|
| Experimental Example 4-1 | Pt | CBCs | CuPS |
| Experimental Example 4-2 | Pt/C | CBCs | Ag |
| Experimental Example 4-3 | Pt | Nafion | CuPS |

Figure 8:
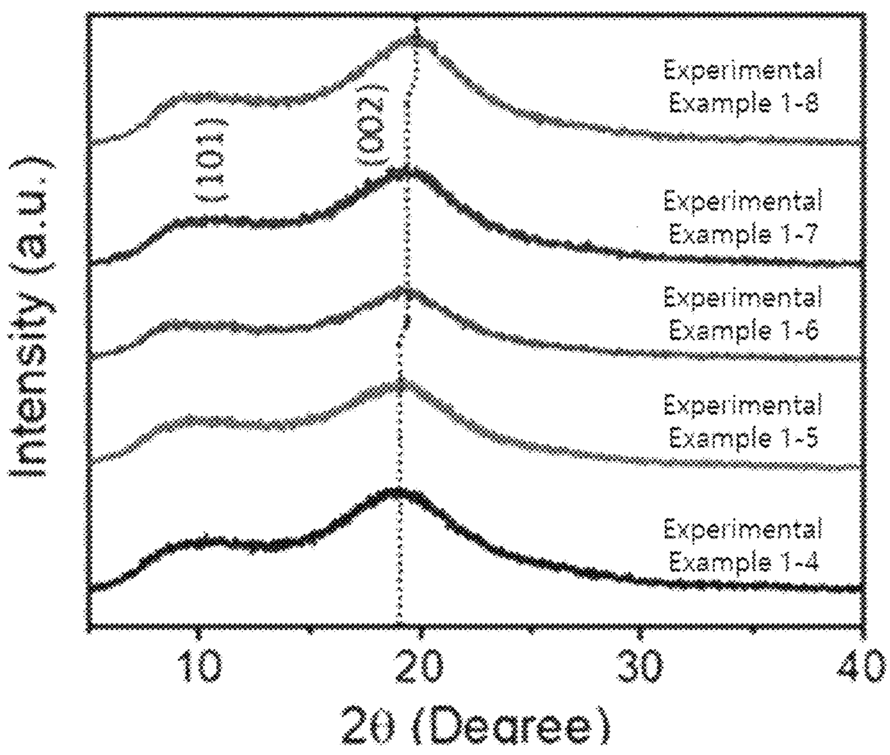
FIG. 8 is a view showing results of an XRD analysis on an anion exchange membrane according to Experimental Examples 1-4 to 1-8 of the present application.

FIG. 8 is a view showing results of an XRD analysis on an anion exchange membrane according to Experimental Examples 1-4 to 1-8 of the present invention.

Referring to FIG. 8, an XRD analysis was performed on the anion exchange membranes according to Experimental Examples 1-4 to 1-8 as described above.

As can be understood from FIG. 8, it can be confirmed that the anion exchange membranes according to Experimental Examples 1-4 to 1-8 have peak values corresponding to (101) and (002) crystal planes, and the crystal structure does not substantially change depending on the ratio of the first complex fiber (oCBC) and the second complex fiber (qCBC), but the 2θ value of the peak value corresponding to (002) crystal plane slightly increases as the ratio of the second complex fiber increases.

Figure 9:
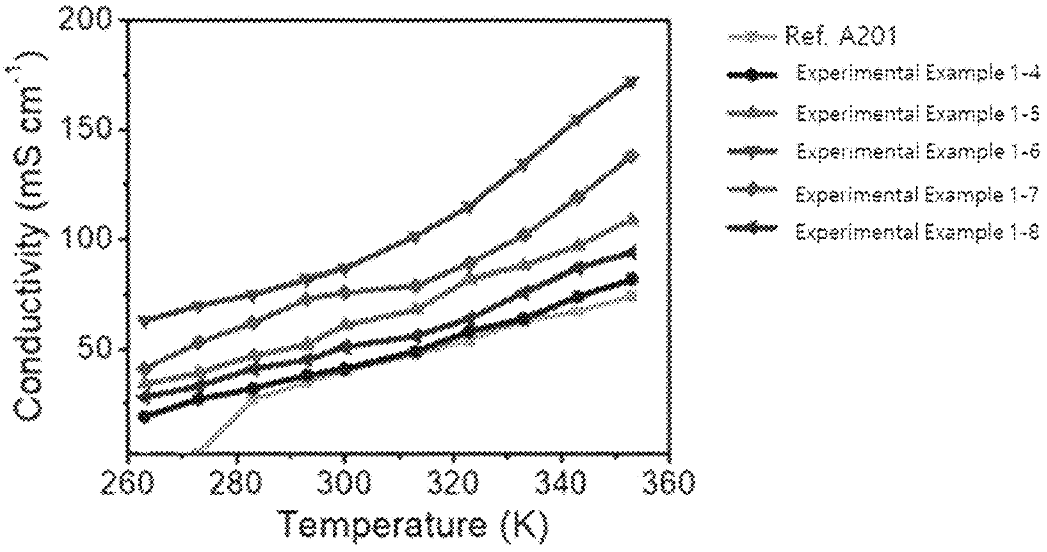
FIG. 9 is a view showing results of measuring ion conductivity depending on a temperature of an anion exchange membrane according to Experimental Examples 1-4 to 1-8 of the present application.

FIG. 9 is a view showing results of measuring ionic conductivity depending on a temperature for an anion exchange membrane according to Experimental Examples 1-4 to 1-8 of the present invention.

Referring to FIG. 9, the ionic conductivity of the anion exchange membranes according to Experimental Examples 1-4 to 1-8 as described above was measured according to temperatures, and the ionic conductivity of the commercially available A201 membrane was measured according to temperatures.

As can be understood from FIG. 9, the ionic conductivity of the anion exchange membranes according to Experimental Examples 1-4 to 1-8 and the A201 membrane increased as the temperature increased. In addition, it can be confirmed that the ionic conductivity of the anion exchange membranes according to Experimental Examples 1-4 to 1-8 is remarkably higher than that of the A201 membrane.

In addition, it can be confirmed that the anion exchange membrane with the same ratio of the first complex fiber and the second complex fiber according to Experimental Example 1-6 has ionic conductivity higher than that of the anion exchange membranes according to Experimental Examples 1-4, 1-5, 1-7, and 1-8. As a result, it can be confirmed that controlling the ratio of the first complex fiber to more than 30 wt % and less than 70 wt %, and controlling the ratio of the second complex fiber to less than 70 wt % and more than 30 wt % is an efficient way to improve the ionic conductivity of OH ions.

Figure 10:
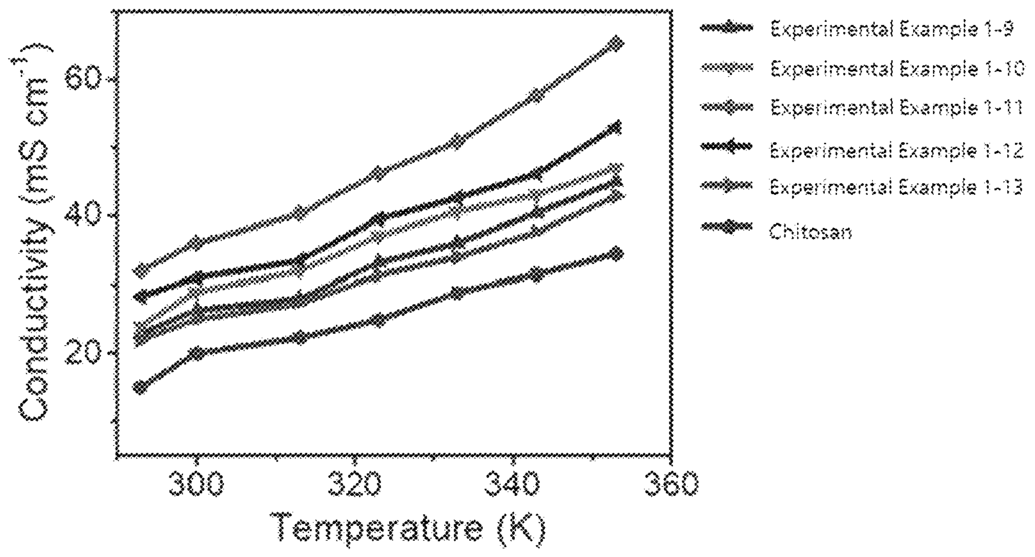
FIG. 10 is a view showing results of measuring ion conductivity depending on a temperature of an anion exchange membrane and chitosan according to Experimental Examples 1-9 to 1-13 of the present application.

FIG. 10 is a view showing results of measuring ion conductivity depending on a temperature of chitosan and a solid electrolyte according to Experimental Examples 1-9 to 1-13 of the present application.

Referring to FIG. 10, ion conductivity for chitosan and a solid electrolyte according to Experimental Examples 1-9 to 1-13 was measured according to a temperature.

As can be understood from FIG. 10, it was found that the ion conductivity of chitosan and the solid electrolyte according to Experimental Examples 1-9 to 1-13 increases as a temperature increases. In addition, it can be confirmed that the ion conductivity of the solid electrolytes according to Experimental Examples 1-9 to 1-13 is remarkably higher than that of chitosan.

In addition, it can be confirmed that the solid electrolyte with 50 wt % of chitosan according to Experimental Example 1-11 has ion conductivity remarkably higher than that of a solid electrolytes according to Experimental Examples 1-9, 1-10, 1-12, and 1-13. As a result, it can be confirmed that controlling the ratio of chitosan to more than 30 wt % and less than 70 wt % in the solid electrolyte is an efficient way to improve the ion conductivity of OH ions.

Figure 11:
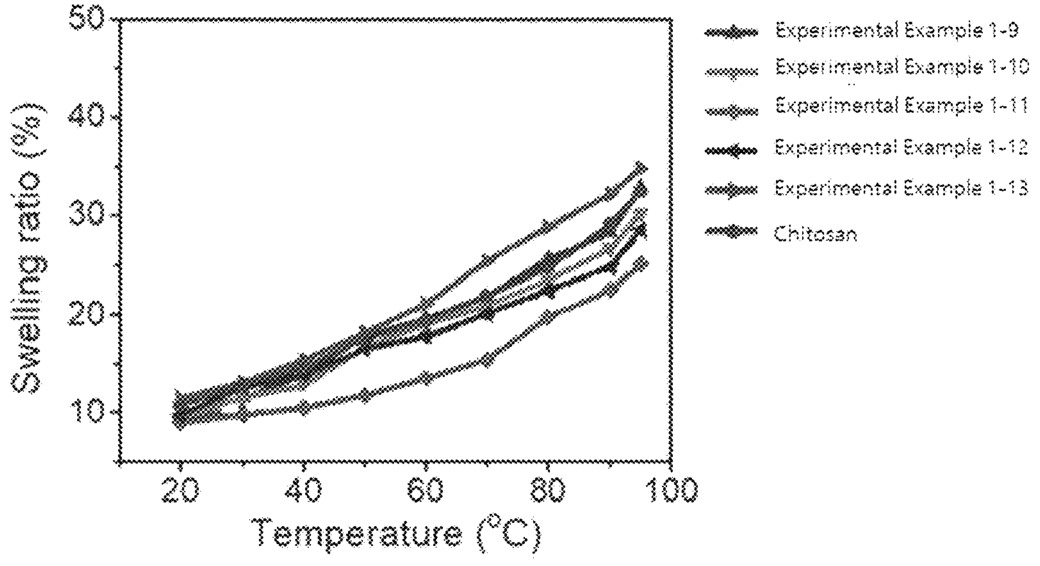
FIG. 11 is a view showing results of measuring a swelling ratio depending on a temperature of an anion exchange membrane and chitosan according to Experimental Examples 1-9 to 1-13 of the present application.

FIG. 11 is a view showing results of measuring a swelling ratio depending on a temperature of chitosan and a solid electrolyte according to Experimental Examples 1-9 to 1-13 of the present application.

Referring to FIG. 11, a swelling ratio for chitosan and a solid electrolyte according to Experimental Examples 1-9 to 1-13 was measured according to a temperature.

As can be understood from FIG. 11, it was found that the swelling ratio of chitosan and the solid electrolyte according to Experimental Examples 1-9 to 1-13 increases as a temperature increases. In addition, it can be confirmed that the solid electrolyte with 50 wt % of chitosan according to Experimental Example 1-11 has a swelling ratio remarkably lower than that of solid electrolytes according to Experimental Examples 1-9, 1-10, 1-12, and 1-13. As a result, it can be confirmed that controlling the ratio of chitosan to more than 30 wt % and less than 70 wt % in the solid electrolyte is an efficient way to improve the swelling ratio.

FIG. 12 is an XRD graph of a positive electrode fabricated according to Experimental Example 3 of the present application.

Referring to FIG. 12, an XRD measurement was performed for a positive electrode fabricated according to Experimental Example 3.

As can be understood from FIG. 12, it can be confirmed that the positive electrode of Experimental Example 3 has (101) crystal plane, (111) crystal plane, (210) crystal plane, (120) crystal plane, (220) crystal plane, (022) crystal plane, (103) crystal plane, and (222) crystal plane, and in particular, a peak corresponding to (101) crystal plane has a size remarkably higher than those of peaks corresponding to crystal planes other than (101) crystal plane. In addition, it can be seen that the positive electrode of Experimental Example 3 has a covellite phase with an orthorhombic crystal structure Pnm21 space group.

Figure 13:
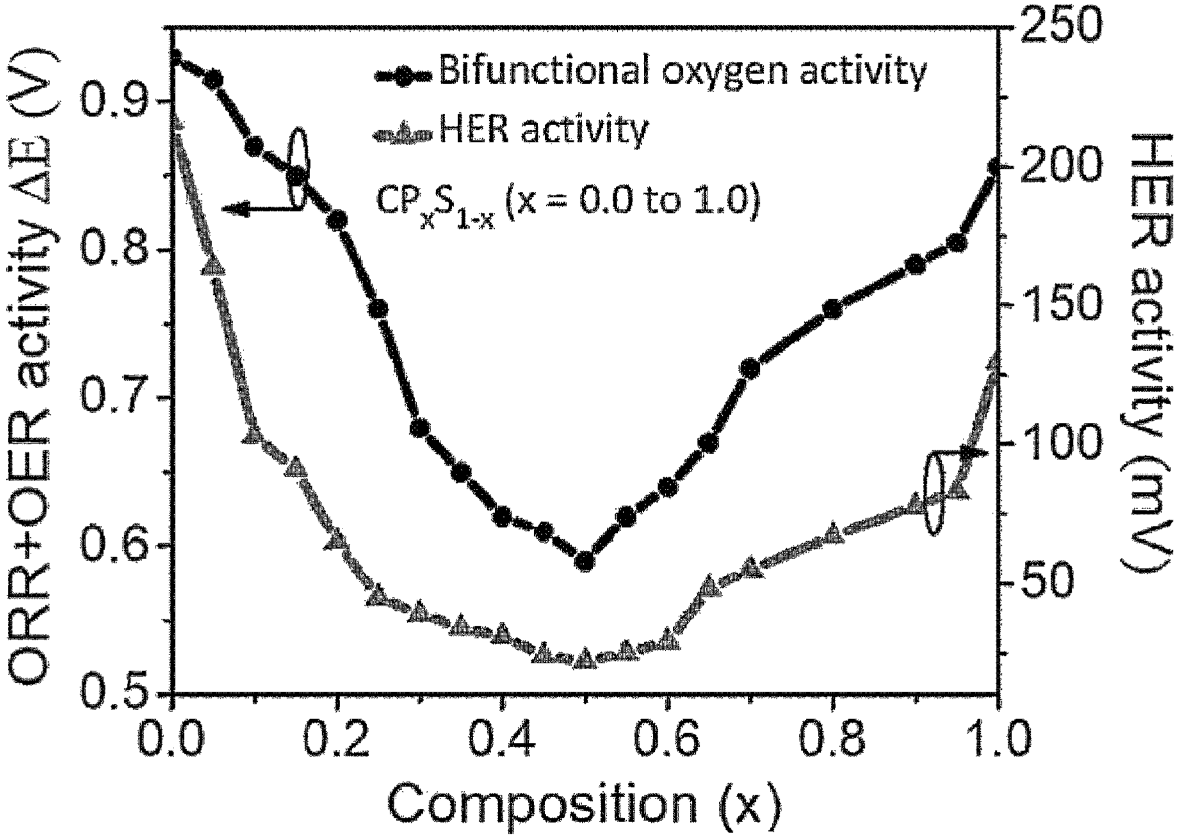
FIG. 13 is a graph showing an evaluation of ORR, OER, and HER properties depending on a composition ratio of P and S in an electrode according to Experimental Example 3 of the present application.

FIG. 13 is a graph showing an evaluation of ORR, OER, and HER properties according to a composition ratio of P and S in an electrode according to Experimental Example 3 of the present application.

Referring to FIG. 13, the ORR, OER, and HER properties according to a composition ratio of P and S were measured shown with regard to the CuPS electrode according to Experimental Example 3.

As can be understood from FIG. 13, it can be confirmed for the CuPS electrode that ORR, OER and HER properties are excellent when a composition ratio of P is more than 0.3 and less than 0.7 and a composition ratio of S is less than 0.7 and more than 0.3. In other words, it can be confirmed for the CuPS electrode that controlling of the composition ratio of P to be more than 0.3 and less than 0.7 and the composition ratio of S to be less than 0.7 and more than 0.3 is an efficient method capable of improving ORR, OER and HER properties.

Figure 14:
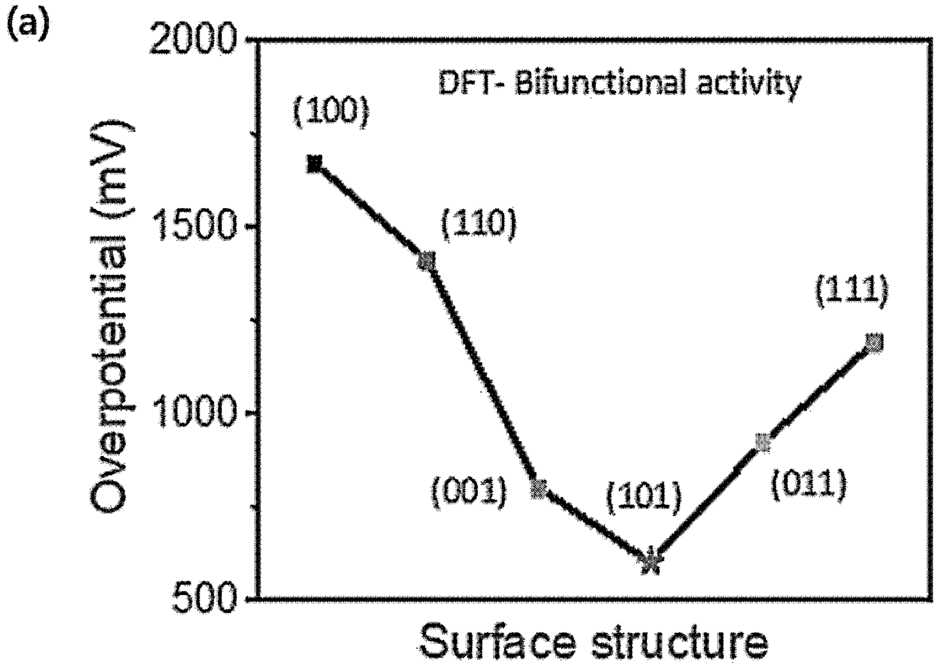
FIG. 14 is a graph showing an evaluation of OER, ORR, and HER properties according to a crystal plane in an electrode according to Experimental Example 3 of the present application.
Figure 14:
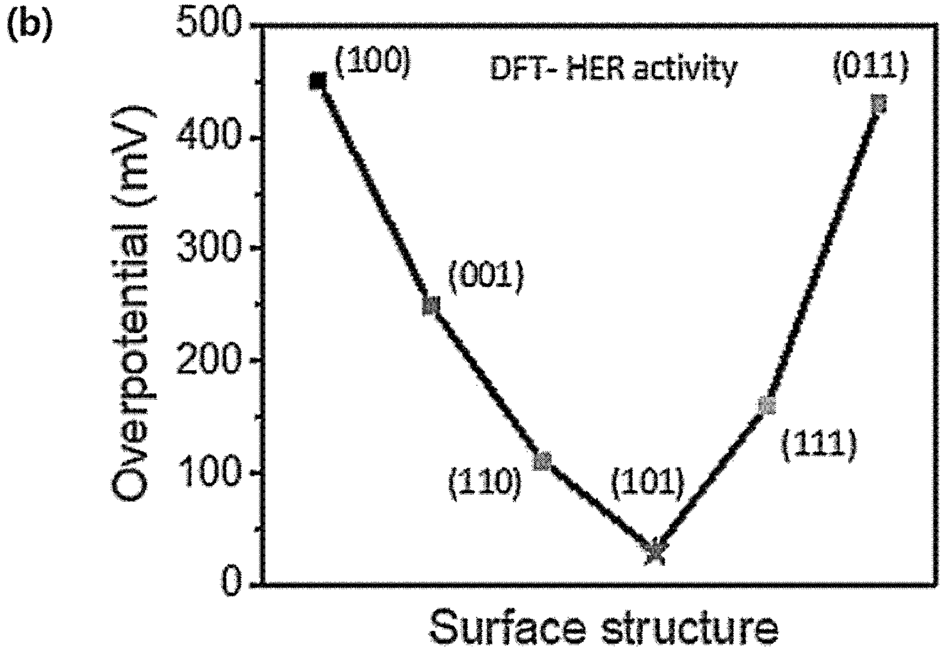

FIG. 14 is a graph showing an evaluation of OER, ORR, and HER properties according to a crystal plane in an electrode according to Experimental Example 3 of the present application.

Referring to FIG. 14, according to the crystal plane of the CuPS electrode according to Experimental Example 3, overpotentials for OER and ORR reactions (bifunctional activity) and overpotentials for HER reactions were calculated using discrete Fourier transforms.

As can be understood from FIG. 14, it can be confirmed that an overpotential value of the crystal plane 101 is the lowest, and thus ORR, OER and HER properties of the electrode in which the crystal plane 101 is developed are improved according to the embodiment of the present application.

In conclusion, fabricating an electrode with a developed (101) crystal plane and using the same as an anode electrode or a cathode electrode of a water electrolysis cell is an efficient method to improve the hydrogen production efficiency of the water electrolysis cell and the power generation efficiency of the fuel cell.

Figure 15:
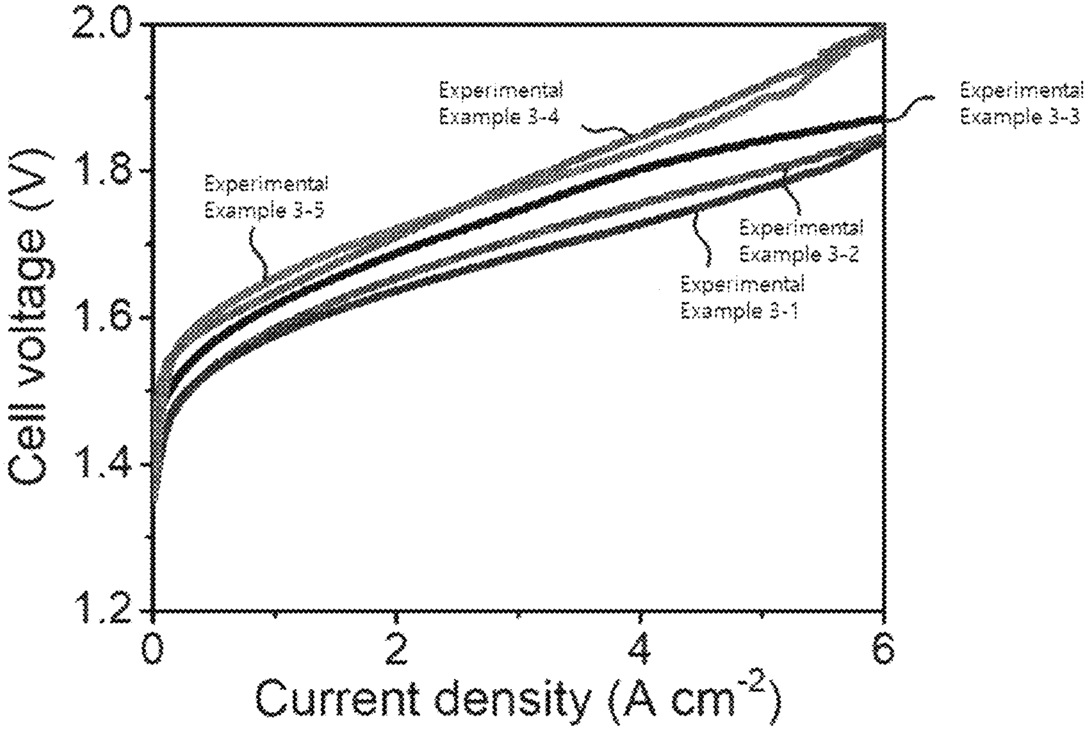
FIG. 15 is a graph showing a comparison of efficiency of a water electrolysis cell according to Experimental Examples 3-1 to 3-5 of the present application.

FIG. 15 is a graph showing a comparison of efficiency of a water electrolysis cell according to Experimental Examples 3-1 to 3-5 of the present application.

Referring to FIG. 15, a comparison was made on the efficiency of water electrolysis cells according to Experimental Examples 3-1 to 3-4 at 1 M KOH and under 80° C. conditions.

Current density values were measured to be 5.47 $Acm^{-2}$, 5.07 $Acm^{-2}$, 4.01 $Acm^{-2}$, 3.50 $Acm^{-2}$, 3.26 $Acm^{-2}$ under the 1.8 V condition in the order of Experimental Example 3-1, Experimental Example 3-2, Experimental Example 3-3, Experimental Example 3-5, and Experimental Example 3-4. In other words, it can be confirmed that a high hydrogen generation efficiency is obtained in the case of including the anion exchange membrane according to an embodiment of the present application and/or including an electrode according to an embodiment of the present application as an anode electrode or a cathode electrode.

In particular, it can be confirmed that a remarkably high hydrogen generation efficiency is obtained in the case of using the anion exchange membrane according to an embodiment of the present application as in Experimental Example 3-3 in comparison with in the case of using a commercially available A201 membrane as shown in Experimental Example 3-5. It can be also confirmed that hydrogen generation efficiency may be improved in the case of using the anion exchange membrane according to an embodiment of the present application and using an electrode according to an embodiment of the present application as an anode electrode.

Figure 16:
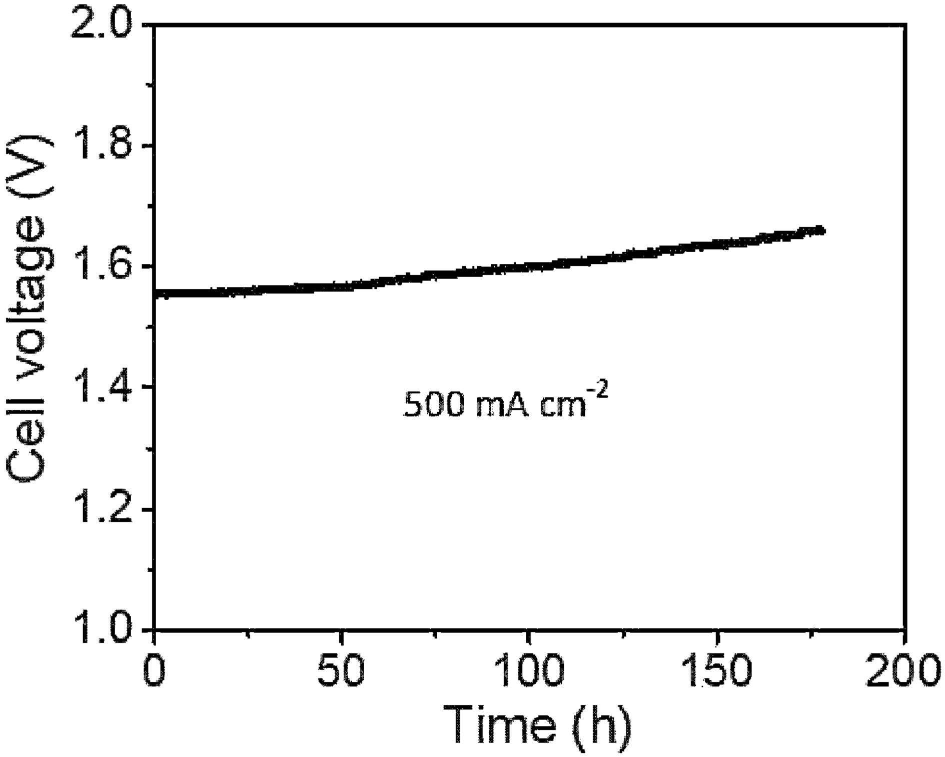
FIG. 16 is a graph showing an evaluation of lifespan properties of a water electrolysis cell according to Experimental Example 3-2 of the present application.

FIG. 16 is a graph showing an evaluation of lifespan properties of a water electrolysis cell according to Experimental Example 3-2 of the present application.

Referring to FIG. 16, the lifespan properties were evaluated with regard to the water electrolysis cell of Experimental Example 3-2 under a high current density condition of 500 $mAcm^{-2}$ and under a condition of 80° C.

As can be seen from FIG. 16, it can be confirmed that the cell is driven without any substantial change, though a voltage value is slightly increased even after 170 hours has elapsed.

In conclusion, it can be confirmed that high hydrogen generation efficiency and long life are obtained in the case of fabricating the water electrolysis cell by using the anion exchange membrane and the electrode according to an embodiment of the present application in comparison with in the case of fabricating the water electrolysis cell by using the commercially available membrane and noble electrode.

Figure 17:
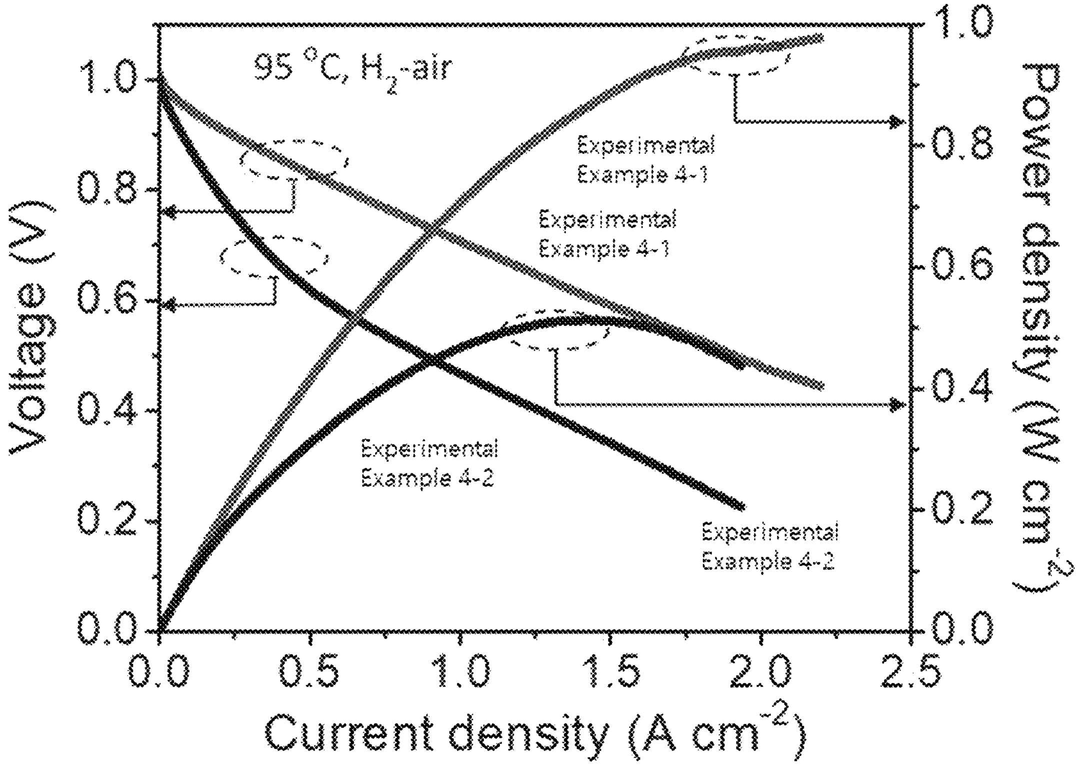
FIG. 17 is a graph showing a comparison of power production efficiency of a fuel cell according to Experimental Examples 4-1 and 4-2 of the present application.

FIG. 17 is a graph showing a comparison of power production efficiency of a fuel cell according to Experimental Examples 4-1 and 4-2 of the present application.

Referring to FIG. 17, voltage and power density were measured according to the current density of the fuel cells of Experimental Examples 4-1 and 4-2 while supplying gas under the conditions of 95° C., a flow rate of 0.15 $Lmin^{-1}$ and 0.95 $Lmin^{-1}$ and a pressure of 2.5 bar and 1.3 bar to the anode electrode and the cathode electrode, respectively.

As can be understood from FIG. 17, it can be confirmed that the cell normally operates even at a high temperature of 95° C. and also has a high efficiency and a high power density of 977 $mWcm^{-2}$ in the case of using the CuPS electrode according to Experimental Example 2 of the present application as a cathode electrode according to Experimental Example 4-1 in comparison with Experimental Example 4-2 having commercialized Ag as a cathode electrode.

Figure 18:
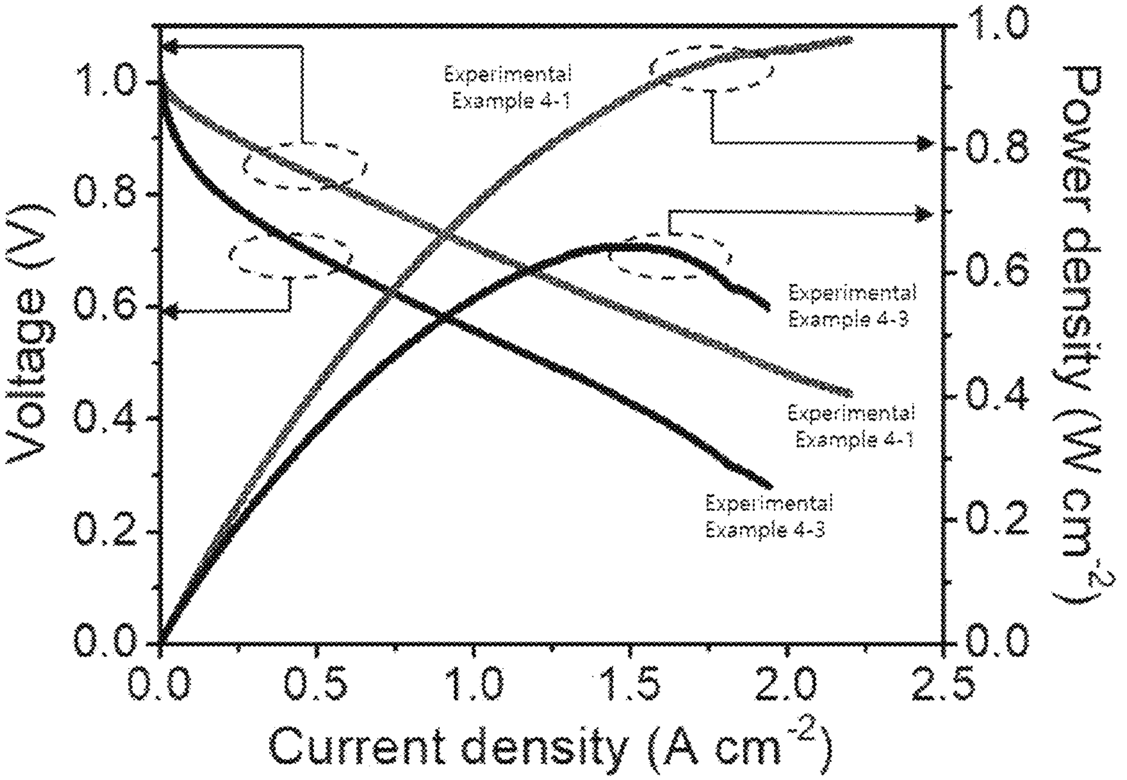
FIG. 18 is a graph showing a comparison of power production efficiency of a fuel cell according to Experimental Examples 4-1 and 4-3 of the present application.

FIG. 18 is a graph showing a comparison of power production efficiency of a fuel cell according to Experimental Examples 4-1 and 4-3 of the present application.

Referring to FIG. 18, voltage and power density were measured according to the current density of the fuel cells of Experimental Examples 4-1 and 4-3 while supplying gas under the conditions of 95° C., a flow rate of 0.15 $Lmin^{-1}$ and 0.95 $Lmin^{-1}$ and a pressure of 2.5 bar and 1.3 bar to the anode electrode and the cathode electrode, respectively.

As can be understood from FIG. 18, it can be confirmed that the cell normally operates even at a high temperature of 95° C. and also has a high efficiency and a high power density of 977 $mWcm^{-2}$ in the case of using the anion exchange membrane of Experimental Example 1-6 of the present application according to Experimental Example 4-1 in comparison with in the case of using commercially available Nafion as an anion exchange membrane as in Experimental Example 4-3.

In conclusion, it can be confirmed that using the anion exchange membrane and the electrode according to an embodiment of the present application is an efficient method to improve the power generation efficiency and high temperature operating properties of the fuel cell.

Figure 19:
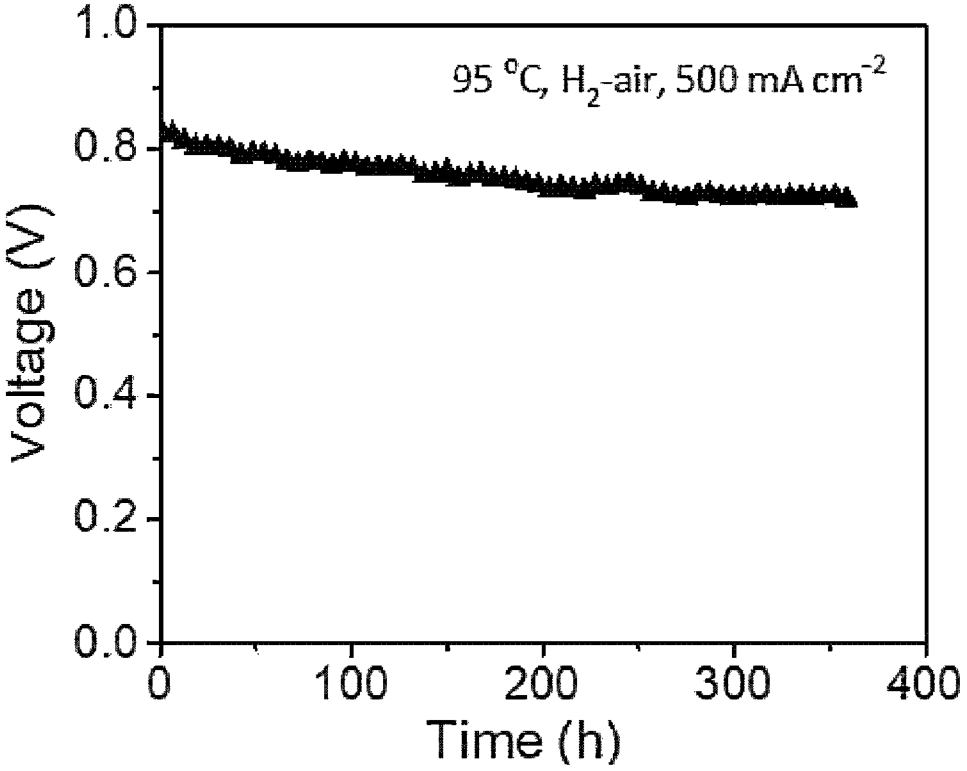
FIG. 19 is a graph showing an evaluation of lifespan properties of a fuel cell according to Experimental Example 4-1 of the present application.

FIG. 19 is a graph showing an evaluation of lifespan properties of a fuel cell according to Experimental Example 4-1 of the present application.

Referring to FIG. 19, a long-term stability of a fuel cell of Experimental Example 4-1 was measured for 360 hours under the condition of 500 $mAcm^{-2}$ while supplying gas under the conditions of 95° C., a flow rate of 0.15 $Lmin^{-1}$ and 0.95 $Lmin^{-1}$ and a pressure of 2.5 bar and 1.3 bar to the anode electrode and the cathode electrode, respectively.

As can be understood from FIG. 19, even after a long time of 360 hours, the cell was stably driven at a high temperature of 95° C. and a loss of only about 10.9% was recorded compared to an initial voltage value.

In conclusion, it can be seen that fabricating the fuel cell using the anion exchange membrane and the electrode according to an embodiment of the present application is a method to improve long life and thermal stability while having high power generation efficiency.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

An electrochemical element according to an exemplary embodiment of the present application may be utilized in various industrial fields such as a water electrolysis cell, a fuel cell, or the like.

The invention claimed is:

1. An anion exchange membrane for a water electrolysis cell or a fuel cell, wherein:

the anion exchange membrane comprises a network formed by base complex fibers containing chitosan, the anion exchange membrane has an ion conductivity of 10 mS $cm^{-1}$ to 200 mS $cm^{-1}$ at a temperature from 260 K to 360 K, the base complex fibers comprise bacterial cellulose, the chitosan is bound to the bacterial cellulose, the bacterial cellulose is bound to a functional group having two nitrogen atoms, the bacterial cellulose is bound via one of the nitrogen atoms of the functional group, the base complex fibers comprise a first base complex fiber in which a surface of the first base complex fiber combined with the bacterial cellulose and the chitosan is oxidized, the base complex fibers comprise a second base complex fiber in which a surface of the second base complex fiber is bound to the functional group having two nitrogen atoms, the first base complex fiber is more than 30 wt % and less than 70 wt % of the anion exchange membrane, and the second base complex fiber is less than 70 wt % and more than 30 wt % of the anion exchange membrane.

2. The anion exchange membrane of claim 1, wherein an XPS analysis result of the anion exchange membrane comprises peak values corresponding to pyrrolic, quaternary, and oxidized N in an N1s spectrum.

3. The anion exchange membrane of claim 1, wherein the anion exchange membrane comprises a mixture of a crystalline phase and an amorphous phase.

4. The anion exchange membrane of claim 1, wherein the anion exchange membrane has an ion conductivity of $OH^-$ ions controlled according to a content of the chitosan.

5. The anion exchange membrane of claim 1, wherein the anion exchange membrane comprises a ratio of the chitosan in an amount of more than 30 wt % and less than 70 wt %.

* * * * *